United States Patent
Lah

(10) Patent No.: US 8,459,608 B2
(45) Date of Patent: Jun. 11, 2013

(54) SEAT AND VALVE SYSTEMS FOR USE IN DELAYED COKER SYSTEM

(75) Inventor: Ruben F. Lah, South Jordan, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 262 days.

(21) Appl. No.: 12/848,013

(22) Filed: Jul. 30, 2010

(65) Prior Publication Data

US 2011/0272617 A1 Nov. 10, 2011

Related U.S. Application Data

(60) Provisional application No. 61/230,682, filed on Jul. 31, 2009.

(51) Int. Cl.
F16K 25/00 (2006.01)
F16K 3/00 (2006.01)

(52) U.S. Cl.
USPC ........... 251/196; 251/176; 251/193; 251/195; 251/328

(58) Field of Classification Search
USPC ................. 251/176, 193, 195, 196, 197, 326, 251/327, 328, 329
See application file for complete search history.

(56) References Cited

U.S. PATENT DOCUMENTS

| | | |
|---|---|---|
| 176,321 A | 4/1876 | Kromer |
| 1,656,355 A | 1/1928 | Huffmann |
| 1,991,621 A | 2/1935 | Noll |
| 2,064,567 A | 12/1936 | Riley |
| 2,245,554 A | 6/1941 | Court |
| 2,317,566 A | 4/1943 | Utterback |
| 2,403,608 A | 7/1946 | Payne et al. |
| 2,562,285 A | 7/1951 | Timmer |
| 2,708,110 A * | 5/1955 | Clay .............................. 267/162 |
| 2,717,865 A | 9/1955 | Kimberlin, Jr. et al. |
| 2,734,715 A | 2/1956 | Knox |
| 2,761,160 A | 9/1956 | Manning |
| 2,950,897 A | 8/1960 | Bryant |
| 3,130,952 A * | 4/1964 | Meyer .......................... 251/175 |
| 3,215,399 A | 11/1965 | McInerney et al. |
| 3,367,625 A * | 2/1968 | Fortune ......................... 251/172 |
| 3,379,623 A | 4/1968 | Forsyth |
| 3,617,480 A | 11/1971 | Keel |

(Continued)

FOREIGN PATENT DOCUMENTS

| | | |
|---|---|---|
| JP | 2000145989 | 5/2000 |
| RU | 2043604 | 10/1995 |

(Continued)

OTHER PUBLICATIONS

U.S. Appl. No. 10/731,874, Non-Final Rejection issued Feb. 23, 2005 by the United States Patent and Trademark Office. pp. 1-10.

(Continued)

*Primary Examiner* — John K Fristoe, Jr.
*Assistant Examiner* — Frederick D Soski
(74) *Attorney, Agent, or Firm* — Kirton McConkie; Michael F. Krieger

(57) ABSTRACT

The present invention provides more efficient, cost effective coke drum valve devices and system as well as more efficient, cost effective methods for isolating the flow of matter in a delayed coker unit operation. Specifically, embodiments of the invention relate to various seat systems used in valves for delayed coking operations.

18 Claims, 32 Drawing Sheets

U.S. PATENT DOCUMENTS

| | | | |
|---|---|---|---|
| 3,646,947 A | | 3/1972 | Rochelle et al. |
| 3,716,310 A | | 2/1973 | Guenther |
| 3,837,356 A | | 9/1974 | Selep et al. |
| 3,852,047 A | | 12/1974 | Schlinger et al. |
| 3,926,406 A | * | 12/1975 | Hind .............................. 251/144 |
| 4,125,438 A | | 11/1978 | Kelly et al. |
| 4,174,728 A | | 11/1979 | Usnick et al. |
| 4,253,487 A | | 3/1981 | Worley et al. |
| 4,275,842 A | | 6/1981 | Purton et al. |
| 4,335,733 A | | 6/1982 | Richards |
| 4,410,398 A | | 10/1983 | Chipman et al. |
| RE31,439 E | | 11/1983 | Rosensweig |
| 4,492,103 A | | 1/1985 | Naumann |
| 4,531,539 A | | 7/1985 | Jandrasi et al. |
| 4,611,613 A | | 9/1986 | Kaplan |
| 4,626,320 A | | 12/1986 | Alworth et al. |
| 4,666,585 A | | 5/1987 | Figgins et al. |
| 4,726,109 A | | 2/1988 | Malsbury et al. |
| 4,738,399 A | | 4/1988 | Adams |
| 4,771,805 A | | 9/1988 | Maa |
| 4,797,197 A | | 1/1989 | Mallari |
| 4,824,016 A | | 4/1989 | Cody et al. |
| 4,877,488 A | | 10/1989 | Cody et al. |
| 4,923,021 A | | 5/1990 | Courmier et al. |
| 4,929,339 A | | 5/1990 | Elliott, Jr. et al. |
| 4,960,358 A | | 10/1990 | Digiacomo et al. |
| 4,973,386 A | | 11/1990 | Callegari et al. |
| 4,993,264 A | | 2/1991 | Cody et al. |
| 5,004,152 A | | 4/1991 | Baker et al. |
| 5,022,266 A | | 6/1991 | Cody et al. |
| 5,022,268 A | | 6/1991 | Wolf et al. |
| 5,024,730 A | | 6/1991 | Colvert |
| 5,035,221 A | | 7/1991 | Martin |
| 5,041,207 A | | 8/1991 | Harrington et al. |
| 5,048,876 A | | 9/1991 | Wallskog |
| 5,059,331 A | | 10/1991 | Goyal |
| 5,107,873 A | | 4/1992 | Clinger |
| 5,116,022 A | | 5/1992 | Genreith et al. |
| 5,221,019 A | | 6/1993 | Pechacek et al. |
| 5,228,525 A | | 7/1993 | Denney et al. |
| 5,228,825 A | | 7/1993 | Fruchtbaum et al. |
| 5,299,841 A | | 4/1994 | Schaefer |
| 5,417,811 A | | 5/1995 | Malsbury |
| H1442 H | | 6/1995 | Edgerton et al. |
| 5,464,035 A | | 11/1995 | Heinecke |
| 5,581,864 A | | 12/1996 | Rabet |
| 5,633,462 A | | 5/1997 | Heaslip et al. |
| 5,652,145 A | | 7/1997 | Cody et al. |
| 5,785,843 A | | 7/1998 | Antalffy et al. |
| 5,800,680 A | | 9/1998 | Guerra |
| 5,816,505 A | | 10/1998 | Tran et al. |
| 5,816,787 A | | 10/1998 | Brinkerhoff et al. |
| 5,876,568 A | | 3/1999 | Kindersley |
| 5,907,491 A | | 5/1999 | Canada et al. |
| 5,927,684 A | | 7/1999 | Marx et al. |
| 5,947,674 A | | 9/1999 | Malsbury et al. |
| 5,974,887 A | | 11/1999 | Cody et al. |
| 6,007,068 A | | 12/1999 | Dellacorte |
| 6,039,844 A | | 3/2000 | Malik |
| 6,066,237 A | | 5/2000 | Kindersley |
| 6,113,745 A | | 9/2000 | Maitland et al. |
| 6,117,308 A | | 9/2000 | Ganji |
| 6,223,925 B1 | | 5/2001 | Malsbury et al. |
| 6,228,225 B1 | | 5/2001 | Meher-Homji |
| 6,254,733 B1 | | 7/2001 | Lu et al. |
| 6,264,797 B1 | | 7/2001 | Schroeder et al. |
| 6,264,829 B1 | | 7/2001 | Antalffy et al. |
| 6,367,843 B1 | | 4/2002 | Fetzer |
| 6,539,805 B2 | | 4/2003 | Heaslip et al. |
| 6,547,250 B1 | | 4/2003 | Noble et al. |
| 6,565,714 B2 | | 5/2003 | Lah |
| 6,644,436 B2 | | 11/2003 | Hofmann et al. |
| 6,644,567 B1 | | 11/2003 | Adams et al. |
| 6,660,131 B2 | | 12/2003 | Lah |
| 6,738,697 B2 | | 5/2004 | Breed |
| 6,751,852 B2 | | 6/2004 | Malsbury et al. |
| 6,843,889 B2 | | 1/2005 | Lah |
| 6,926,807 B2 | | 8/2005 | Bosi et al. |
| 6,964,727 B2 | | 11/2005 | Lah |
| 6,989,081 B2 | | 1/2006 | Lah |
| 7,033,460 B2 | | 4/2006 | Lah |
| 7,037,408 B2 | | 5/2006 | Wilborn et al. |
| 7,115,190 B2 | | 10/2006 | Lah |
| 7,117,959 B2 | | 10/2006 | Lah |
| 7,316,762 B2 | | 1/2008 | Lah |
| 2002/0134658 A1 | | 9/2002 | Lah |
| 2002/0157897 A1 | | 10/2002 | Hoffmann et al. |
| 2002/0166862 A1 | | 11/2002 | Malsbury et al. |
| 2002/0170814 A1 | | 11/2002 | Lah |
| 2003/0047153 A1 | | 3/2003 | Kubel et al. |
| 2003/0089589 A1 | | 5/2003 | Malsbury |
| 2003/0127314 A1 | | 7/2003 | Bell et al. |
| 2003/0159737 A1 | | 8/2003 | Stares |
| 2003/0185718 A1 | | 10/2003 | Sellakumar |
| 2004/0118746 A1 | | 6/2004 | Wilborn et al. |
| 2004/0154913 A1 | | 8/2004 | Lah |
| 2005/0067603 A1 | * | 3/2005 | Lucas et al. ................... 251/326 |
| 2008/0251749 A1 | * | 10/2008 | Lah et al. ...................... 251/195 |

FOREIGN PATENT DOCUMENTS

| | | |
|---|---|---|
| RU | 2163359 C1 | 2/2001 |
| SU | 558524 A | 11/1973 |
| SU | 959413 A | 12/1980 |
| WO | 200015985 | 3/2000 |

OTHER PUBLICATIONS

U.S. Appl. No. 10/731,874, Final Rejection issued Jun. 28, 2005 by the United States Patent and Trademark Office. pp. 1-7.

U.S. Appl. No. 10/731,874, Examiner's search and strategy results issued Sep. 26, 2005. 1 page.

U.S. Appl. No. 10/731,874, Notice of Allowance of Fees Due, Issue Information, Index of Claims and Search information issued Sep. 29, 2005 by the United States Patent and Trademark Office; 7 pages.

U.S. Appl. No. 10/731,874, Notice of Allowance of Fees Dues, List of References, Issue Information, Search information and index of claims issued Jan. 18, 2006 by the United States Patent and Trademark Office; 10 pages.

U.S. Appl. No. 10/731,874, Non-Final Rejection issued Oct. 13, 2006 by the United States Patent and Trademark Office; 22 pages.

U.S. Appl. No. 10/731,874, Non-Final Rejection issued Apr. 6, 2007 by the United States Patent and Trademark Office; 14 pages.

U.S. Appl. No. 10/731,874, Requirement for Restriction/Election, List of References and index of claims issued Sep. 6, 2007 by the United States Patent and Trademark Office; 20 pages.

U.S. Appl. No. 10/731,874, Examiner's search strategy and results issued Dec. 5, 2007, 1 page.

U.S. Appl. No. 10/731,874, Non-Final Rejection issued Dec. 11, 2007 by the United States Patent and Trademark Office; 22 pages.

U.S. Appl. No. 10/997,834, Examiner's search strategy and results issued Jun. 22, 2005, 5 pages.

U.S. Appl. No. 10/997,834, Non-Final Rejection issued Jul. 6, 2005 by the United States Patent and Trademark Office; 44 pages.

U.S. Appl. No. 10/997,834, Examiner's search strategy and results issued Sep. 26, 2005; 1 page.

U.S. Appl. No. 10/997,834, Notice of Allowance and Fees, Issue Information, Index of Claims and search information issued Sep. 29, 2005 by the United States Patent and Trademark Office; 8 pages.

U.S. Appl. No. 10/411,849, Examiner's search strategy and results issued Aug. 4, 2005; 5 pages.

U.S. Appl. No. 10/411,849, Non-Final Rejection issued Aug. 9, 2005 by the United States Patent and Trademark Office; 8 pages.

U.S. Appl. No. 10/411,849, Non-Final Rejection issued Feb. 8, 2006 by the United States Patent and Trademark Office; 7 pages.

U.S. Appl. No. 10/411,849, Examiner's search strategy and results issued Jul. 18, 2006; 1 page.

U.S. Appl. No. 10/411,849, Notice of Allowance and Fees Due, Examiner Interview Summary Record, Issue Information, Index of Claims, Search Information and Bibliographic Data Sheet issued Jul. 24, 2006 by the United States Patent and Trademark Office; 14 pages.

U.S. Appl. No. 10/997,234, Examiner's search strategy and results issued Mar. 14, 2006; 3 pages.

U.S. Appl. No. 10/997,234, Non-Final Rejection issued Mar. 20, 2006 by the United States Patent and Trademark Office, 13 pages.

U.S. Appl. No. 10/997,234, Examiners search strategy and results issued Aug. 4, 2006; 1 page.

U.S. Appl. No. 10/997,234, Notice of Allowance and Fees Due, Issue Information, Bibliographic Data Sheet, Index of Claims and Search Information issued Aug. 10, 2006 by the United States Patent and Trademark Office, 8 pages.

U.S. Appl. No. 10/412,628, Non-Final Rejection issued Feb. 16, 2007 by the United States Patent and Trademark Office; 17 pages.

U.S. Appl. No. 10/412,628, Notice of Allowance and Fees Due, Bibliographic Data Sheet, Index of Claims, Search Information and Issue Information issued Aug. 24, 2007 by the United States Patent and Trademark Office; 11 pages.

U.S. Appl. No. 10/873,022, Non-Final Rejection issued Jul. 7, 2005 by the United States Patent and Trademark Office, 12 pages.

U.S. Appl. No. 10/873,022, Notice of Allowance and Fees Due, Specification and Issue Information issued Jan. 4, 2006 by the United States Patent and Trademark Office, 9 pages.

U.S. Appl. No. 10/274,280, Examiner's search strategy and results issued Mar. 14, 2004; 2 pages.

U.S. Appl. No. 10/274,280, Non-Final Rejection issued Mar. 25, 2004 by the United States Patent and Trademark Office; 10 pages.

U.S. Appl. No. 10/274,280, Notice of Allowance and Fees Due, Issue Information and Bibliographic Data Sheet issued Oct. 5, 2004 by the United States Patent and Trademark Office; 8 pages.

U.S. Appl. No. 10/442,673, Examiner's search strategy and results issued Aug. 26, 2004, 2 pages.

U.S. Appl. No. 10/442,673, Non-Final Rejection issued Sep. 1, 2004 by the United States Patent and Trademark Office; 10 pages.

U.S. Appl. No. 10/442,673, Final Rejection issued Feb. 23, 2005 by the United States Patent and Trademark Office; 6 pages.

U.S. Appl. No. 10/442,673, Notice of Allowance and Fees Due, Amendment After Final, Issue Information, Index of Claims and Search Information issued Apr. 20, 2005 by the United States Patent and Trademark Office; 10 pages.

J. J. Kelley, "Applied Artificial Intelligence for Delayed Coking", Hydrocarbon Processing, Nov. 2000, 144-A-144-J, Gulf Publishing Company, USA.

Claudio Allevato & Richard S. Boswell, "Assessing the Structural Integrity and Remaining Life of Coke Drums with Acoustic Emission Testing, Stain Gaging, and Finite Element Analysis," ETCE 99—Symposium on Plant and Facilities Reliability and Mechanical Integrity, 1999 Engineering Source Technology Conference & Exhibition, Stress Engineering Services, Inc.

Paul J. Ellis & Christopher A. Paul, "Tutorial: Delayed Coking Fundamentals," AIChE 1998 Spring National Meeting's International Conference on Refinery Processes Topical Conference Preprints 1998, 1998, Great Lakes Carbon Corporation.

Norm Lieberman, "Coke Drum Foam-Overs Causes & Cures," http://www.coking.com/Foamover.htm (May 7, 2002), available at http://web.archive.org/web/20020507212053/http://www.coking.com/Foamover.htm.

Zappe, R.W., Valve Selection Handbook, Fourth Edition, Gulf Publishing Company, Houston, Texas (Dec. 31, 1998).

* cited by examiner

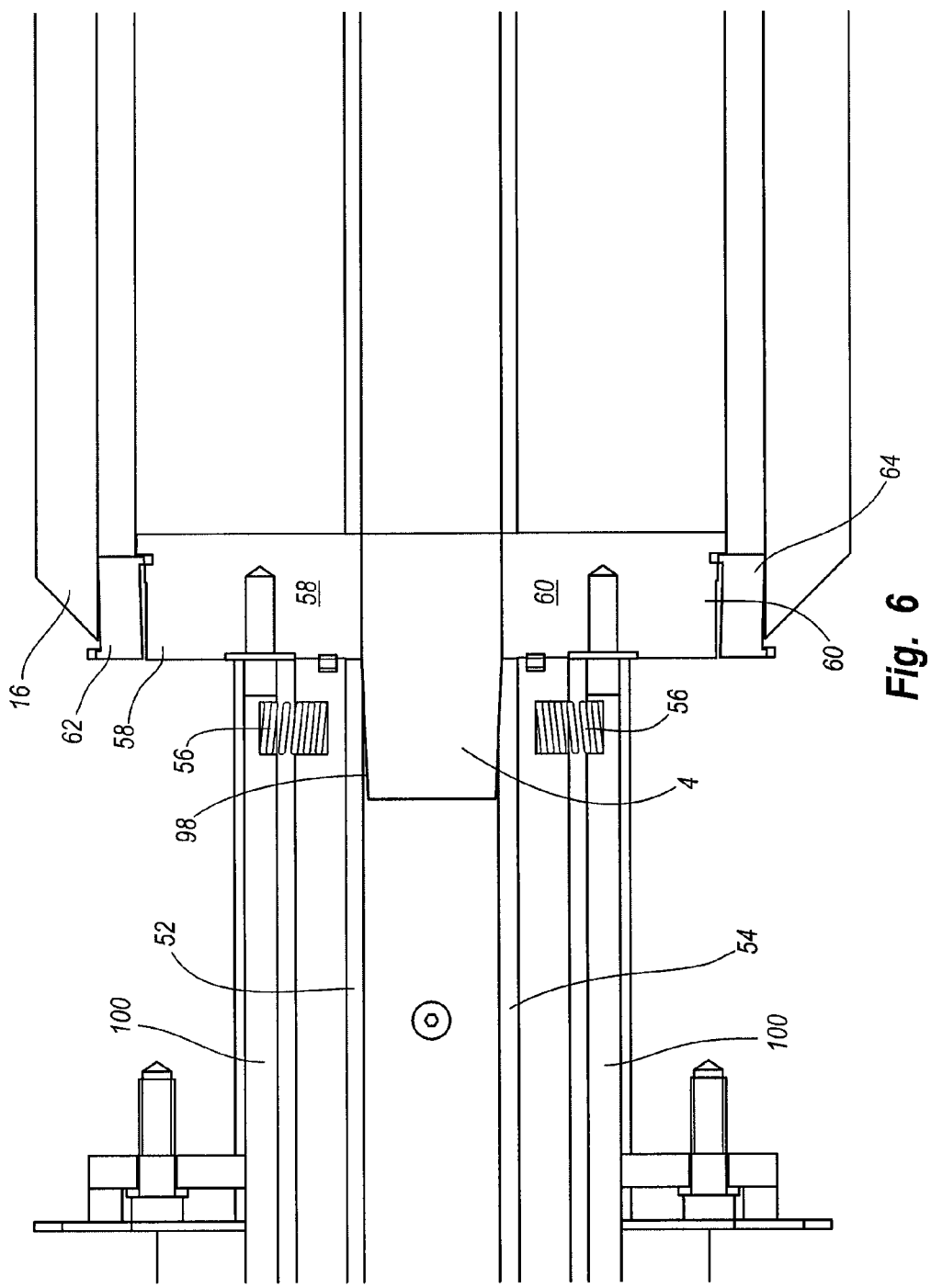

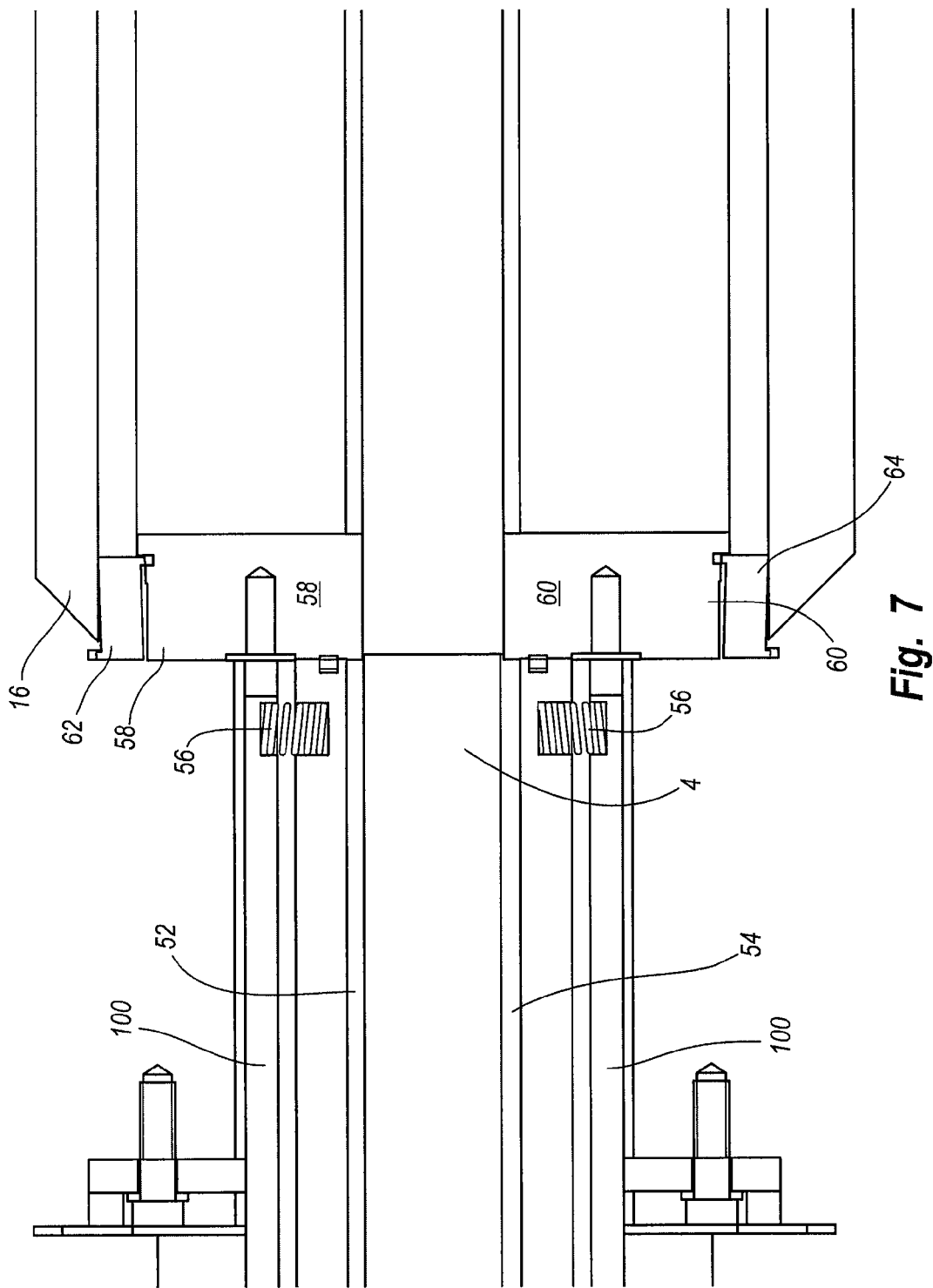

SEAT AND VALVE SYSTEMS FOR USE IN DELAYED COKER SYSTEM

RELATED APPLICATIONS

This application claims priority to U.S. Provisional Patent Application Ser. No. 61/230,682 entitled "Seat and Valve Systems for Use in Delayed Coker System."

BACKGROUND

1. Field of the Invention

The present invention relates to delayed coker unit operations. Specifically, the present invention relates to various seat systems that may be used in conjunction with valves used in a delayed coker unit operation.

2. Background

Petroleum refining operations in which crude oil is processed frequently produce residual oils that have very little value. The value of residual oils can be increased when processed in a delayed coker unit ("DCU"). Residual oil, when processed in a delayed coker, is heated in a furnace to a temperature sufficient to cause destructive distillation in which a substantial portion of the residual oil is converted, or "cracked" to usable hydrocarbon products and the remainder yields a residual petroleum by-product which is pumped into a large vessel hereafter called a "coke drum."

The production of coke is a batch process. Each delayed coker unit usually contains more than one coke drum. In delayed coking, the feed material is typical residuum from vacuum distillation towers and frequently includes other heavy oils. The feed is heated as it is sent to one of the coke drums. The feed arrives at a coke drum with a temperature ranging from 870 to 910° F. Typical drum overhead pressure ranges from 15 to 35 PSIG. Coker feedstock is deposited as a hot liquid slurry in a coke drum. Under these conditions, cracking proceeds and lighter fractions produced flow out of the top of the coke drum and are sent to a fractionation tower where they are separated into vaporous and liquid products. A solid, residuum called coke is also produced and remains within the drum. When a coke drum is filled, residual oil from the furnace is diverted to another coke drum. When a coke drum is filled to the desired capacity, and after feedstock is diverted to another drum, steam is typically introduced into the drum to strip hydrocarbon vapors off of the solid material. The material remaining in the coke drum cools and is quenched. Solid coke forms as the drum cools and must be removed from the drum so that the drum can be reused. While coke is being cooled in one drum and while the cooled solid coke is being extracted from that drum, a second drum is employed to receive the continuous production of coke feedstock as a part of the delayed coker process. The use of multiple coke drums enables the refinery to operate the furnace and fractionating tower continuously. Drum switching frequency ranges from 10 to 24 hours.

In typical coking operations dramatic heat variances are experienced by elements in the coking operation. For example, a coke drum is filled with incoming byproduct at about 900 degrees Fahrenheit and subsequently cooled after being quenched to nearly ambient temperatures. Not surprisingly, this repetitive thermal cycling may create or cause significant problems including stark heat distributing variances throughout various components of a valve system. The heated residual byproduct utilized in coking operations comes into contact with not only the coke drum, but valve and seat components. This heating and subsequent cooling may result in expansion of various elements within a valve system.

As previously mentioned the delayed coking process typically comprises at least two vessels so that while one is being filled the other is being purged of material and prepped to receive another batch of byproduct. Thus, during the off cycle, when a vessel is being purged of its contents it will cool and return to a state of equilibrium. It is this cyclical pattern of dispensing hot residual byproduct into a vessel or through a line and subsequently cooling the byproduct that leads to thermal differential and stress within a vessel, a valve, the valve parts or a line. It is this cyclical loading and unloading and stressing and un-stressing of a vessel, valve or line that is referred to as thermal cycling. Thermal cycling typically results in the weakening or fatiguing of a vessel, a valve and its parts which may lead to a reduction in the useful life of the vessel, valve or line. Advantages of some embodiments include similar seat masses between first and second seats decreasing heat variants. Uneven heat distributions or thermal variants existing between various components of the seat system result in decreased longevity of the constitutive elements of the valve body.

SUMMARY

Embodiments of the present invention relate to seat systems for use with valve devices in a delayed coker unit operation.

Some embodiments of a seat system comprise a first seat or seat cartridge; a second seat or seat cartridge aligned with said first seat; a blind; a main body having an orifice dimensioned to align with an orifice in said line; wherein said main body is coupled to said line.

Some embodiments of a seat system may be preassembled into a cartridge. In some embodiments the seat cartridge may be structured to allow a seat system to stay together eliminating the need to load and unload the seat system during installation and or removal from a valve system.

In some embodiments the seat elements are not bolted to a valve. Bolting in prior art seat system restrained the movement of seat systems.

Some embodiments of a seat system comprise at least one shoulder bolt which limits the vertical movement of seats. Some embodiments of a preassembled cartridge seat system comprise an upper seat segment and lower seat segment. Some embodiments of a preassembled cartridge seat system comprise a packing gland disposed between an upper seat segment and lower seat segment. Some embodiments of a preassembled cartridge seat system comprise outer packing and/or inner packing disposed between an upper seat segment and lower seat segment which may be structured to effectively block the flow of steam and residual byproduct. Some embodiments of the preassembled cartridge seat system comprise a shoulder bolt recess which may be structured to accommodate a shoulder bolt. Some embodiments of a preassembled cartridge seat system may comprise a steam line. Some embodiments of a preassembled cartridge seat system may comprise a spring which may be structured to effectively apply a downward force on the lower seat segment to pressure the lower seat segment against the blind. Some embodiments of a preassembled cartridge seat system may comprise a spring pocket which may be structured to accommodate a spring located between the upper seat segment and lower seat segment. Some embodiments of a preassembled cartridge seat system may utilize a lower seat segment comprising a vertical wall which may be structured to effectively retain the inner packing gland, the outer packing gland, and/or the packing gland effectively in some embodiments preventing axial displacement of the contained elements. Some embodiments of a preassembled cartridge seat system may comprise a packing gland comprising a vertical wall structured to operably interact with a vertical wall of a lower seat segment. Some embodiments of a preassembled cartridge seat system may comprise an upper seat segment.

Some embodiments allow for inline serviceability. Some embodiments allow the main body of a valve to remain in line to service, inspect, replace, and or repair various internal components of the valve system.

Some embodiments may comprise an upper and lower bonnet coupled to said main body, wherein said bonnets may be removed in order to replace valve parts without separating the main body from the line; and a plate located inside a bonnet.

Some embodiments comprise: a) an valve coupled to a line or to a coke drum in the delayed coker unit operation wherein said line may be an inlet resid feed line, a vapor line and/or other various lines utilized in the delayed coker unit operation to move matter from one location to another wherein the valve comprises: 1) a main body having an orifice dimension to align with the line or an orifice in a coke drum when the valve is coupled thereto; 2) a valve closure operably supported by the main body, wherein the valve closure is capable of being actuated to oscillate between an open and closed position with respect to the orifice of the valve and the port of the line or coke drum; 3) a seat comprising wherein the seat additionally functions to sheer any coke or by-product material that has accumulated near the valve thus effectively cleaning the valve upon actuation of the valve closure; and b) a means for actuating the valve closure.

Some embodiments may also comprise an upper and lower bonnet coupled to said main body, wherein said bonnet may be removed in order to replace valve parts without separating the main body from the line; and one or more plates located inside a bonnet wherein the plate(s) comprise a planar surface that may contact one or more surfaces on the blind.

Some embodiments of a valve system are structured to allow a valve to be held in a partially open position for a substantial period during the delayed coker unit operation. For example, a back warming valve in a delayed coker unit operation is often in a partially open position. The internal shrouding mechanism of some embodiments may be structured to prevent the build up of coke oil or other matter inside the shroud and on the various internal components of the shroud system. Accordingly, the valve of the present invention may be maintained in a partially opened position for nearly indefinite periods of time without affecting the performance of the valve system or its ability to be opened or closed.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 6 illustrates a close up view of a lower bonnet system according to some embodiments, where the valve is in an open position;

FIG. 7 illustrates a cutaway view of a lower bonnet system according to an embodiment, where the valve is in a closed position;

DETAILED DESCRIPTION OF THE INVENTION

It will be readily understood that the components of the present invention, as generally described and illustrated in the figures herein, could be arranged and designed in a wide variety of different configurations. Thus, the following more detailed description of the embodiments of the system, device, and method of the present invention, as represented in FIGS. 1 through 16, is not intended to limit the scope of the invention, as claimed, but is merely representative of some examples of embodiments of the invention.

Embodiments of the invention will be best understood by reference to the drawings wherein like parts are designated by like numerals throughout. The following more detailed description is divided into sections. The first section pertains to and sets forth a general discussion of the delayed coking process. The second section pertains to and sets forth the valve and seat system, including the variety of valves or valve-types that may be utilized in the delayed coking process, as well as the various methods for utilizing the system within a delayed coking or other similar environment. It is noted that these sections are not intended to be limiting in any way, but are simply provided as convenience to the reader.

For the purposes of the present application the term "line" shall mean a conduit through which matter flows. Cutting-water inlet line, overhead vapor line, blowdown line, module switching line, back-warming line, fractionator line, drum bypass line, heater charge pump discharge line, resid inlet line, switch manifold line, pre-heat warm up line, quench water line, steam inlet line, drain-to-pit line and/or any other type of lines through which matter, including any fluid, gas and/or solid may or does pass during delay coker operation are examples of lines contemplated by the present invention.

General Discussion on the Delayed Coking Process

The fundamental goal of coking is the thermal cracking of very high boiling point petroleum residues into lighter fuel fractions. To produce the coke, a delayed coker feed originates from the crude oil supplied to the refinery and travels through a series of process members and finally empties into one of the coke drums used to manufacture coke. Coke is a byproduct of the process. Delayed coking is an endothermic reaction with a furnace supplying the necessary heat to complete the coking reaction in a drum. Delayed coking is a thermal cracking process used in petroleum refineries to upgrade and convert petroleum residuum into liquid and gas product streams leaving behind a solid concentrated carbon material, or coke. A furnace is used in the process to reach thermal cracking temperatures, which range upwards of 1,000° F. With short residence time in the furnace, coking of the feed material is thereby "delayed" until it reaches large coking drums downstream of the heater.

Figure 1:
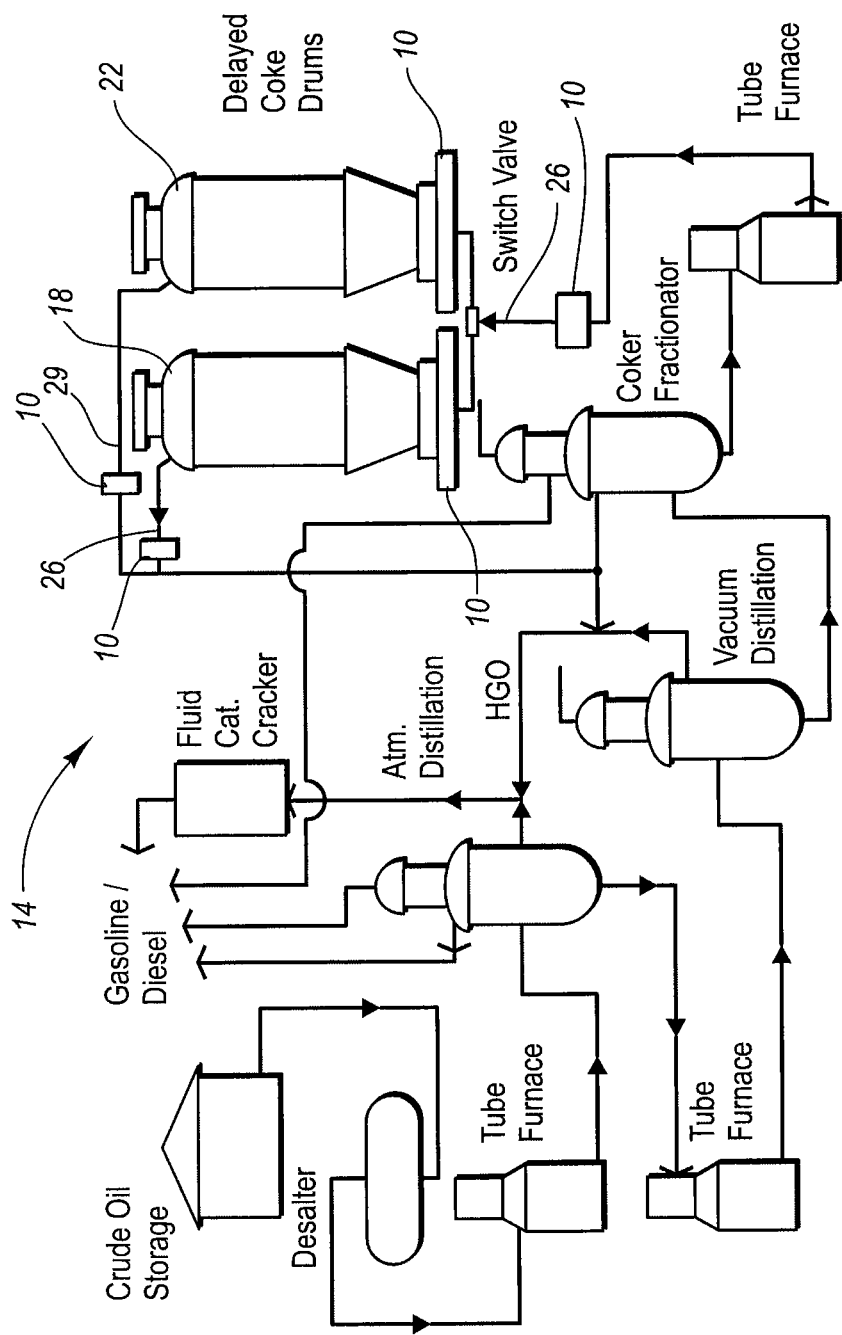
FIG. 1 illustrates an exemplary delayed coker unit operation.

A basic refinery flow diagram is presented as FIG. 1, with two coke drums shown. The delayed coking process typically comprises a batch-continuous process, which means that the process is ongoing or continuous as the feed stream coming from the furnace alternates filling between the two or more coke drums. While one drum is on-line filling up with petroleum residuum, the other is being stripped, cooled, emptied, and prepared to receive another batch.

Petroleum residuum or "resid" as it is commonly referred to, from the tube furnace is fed into one of the coke drums in the system. The oil is extremely hot and produces hot vapors that condense on the colder walls of the coke drum. As the drum is being filled, a large amount of liquid runs down the sides of the drum into a boiling turbulent pool at the bottom. As this process continues, the hot resid and the condensing vapors cause the coke drum walls to heat. This naturally in turn, causes the resid to produce less and less of the condensing vapors, which ultimately causes the liquid at the bottom of the coke drum to start to heat up to coking temperatures. After some time, a main channel is formed in the coke drum, and as time goes on, the liquid above the accumulated coke decreases and the liquid turns to a more viscous type tar. This tar keeps trying to run back down the main channel which can coke at the top, thus causing the channel to branch. This process progresses up through the coke drum until the drum is full, wherein the liquid pools slowly turn to solid coke. When the first coke drum is full, the hot oil feed is switched to the second coke drum, and the first coke drum is isolated, steamed to remove residual hydrocarbons, cooled by filling with water, opened, and then emptied. This cyclical process is repeated over and over again throughout the manufacture of coke.

The cooled hardened coke is removed from the drum upon completion of the coking process. Due to the shape of the coke drum, coke accumulates in the area near and attaches to the flanges or other members used to close off the opening of the coke drum during the manufacturing process. To remove coke from the drum, the flanges or members must first be removed or relocated. In the case of a flanged system, once full, the coke drum is vented to atmospheric pressure and the top flange (typically a 4-foot diameter flange) is unbolted and removed to enable placement of a hydraulic coke cutting apparatus. After the cooling water is drained from the vessel, the bottom flange (typically a 7-foot-diameter flange) is unbolted and removed. This process is commonly known as "de-heading" because it removes or breaks free the head of coke that accumulates at the surface of the flange. Once the flanges are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or a loading facility.

In a typical petroleum refinery process, several different physical structures of petroleum coke may be produced. These are namely, shot coke, sponge coke, and/or needle coke (hereinafter collectively referred to as "coke"), and are each distinguished by their physical structures and chemical properties. These physical structures and chemical properties also serve to determine the end use of the material. Several uses are available for manufactured coke, some of which include fuel for burning, the ability to be calcined for use in the aluminum, chemical, or steel industries, or the ability to be gasified to produce steam, electricity, or gas feedstock for the petrochemicals industry.

The exact mechanism of delayed coking is complex, and out of all the reactions that occur, only three distinct steps have been isolated: 1) partial vaporization and mild coking of the feed as it passes through the furnace; 2) cracking of the vapor as it passes through the coke drum; and 3) cracking and polymerization of the heavy liquid trapped in the drum until it is converted to vapor and coke. The process is extremely temperature-sensitive with the varying temperatures producing varying types of coke. For example, if the temperature is too low, the coking reaction does not proceed far enough and pitch or soft coke formations may occur. If the temperature is too high, the coke formed is generally very hard and difficult to remove from the drum with hydraulic equipment. Higher temperatures also increase the risk of coking in the furnace tubes or the transfer line.

Valve and Seat System

The present invention may be utilized to control the flow of matter, including any fluids, solids and/or gases, at any point in the delayed coker unit operation. Additionally, one ordinarily skilled in the art will recognize that the valve as explained and described herein may also be designed and used in other environments where controlling the movement of matter, including fluids, solids and/or gases, is desirable.

The specification describes a valve system and method for isolating the flow of a substance during the delayed coking process. As the present invention is especially adapted to be used in the coking process, the following discussion will relate specifically in this manufacturing area. It is foreseeable however, that the present invention may be adapted to be an integral part of other manufacturing processes producing various elements or by-products other than coke, and such processes should thus be considered within the scope of this application. Prior to reciting the specifics of the present invention, it should be noted that the present invention system and method is designed to have or possess significant functional, utility, and safety advantages over prior related designs and systems.

Some embodiments of the valve system may comprise a seat system for isolating the flow of matter from one location to another through a line from a coke drum, to a coke drum or between any processing steps in a delayed coker unit operation. Embodiments of the valve system comprise a first seat or seat cartridge; a second seat or seat cartridge aligned with said first seat or seat cartridge; a blind; a main body having an orifice dimensioned to align with an orifice in a line or coke drum, wherein said main body is coupled to said line or coke drum. Some embodiments further comprise at least one bonnet. Some embodiments may comprise an upper and lower bonnet coupled to a main body, wherein the bonnets may be removed in order to replace valve parts without separating the main body from the line or coke drum. Some embodiments comprise a plate located inside a bonnet, wherein the plate comprises a planar surface that contacts a surface of the blind.

Some embodiments comprise: a) an valve coupled to a line or a coke drum in the delayed coker unit operation wherein the line may be an inlet resid feed line, a vapor line and/or other various lines utilized in the delayed coker unit operation to move matter from one location to another. In some embodiments a valve may comprise: 1) a main body having an orifice dimension to align with the line or an orifice in a coke drum when the valve is coupled thereto; 2) a valve closure operably supported by the main body, wherein the valve closure is capable of being actuated to oscillate between an open and closed position with respect to the orifice of the valve and the port of the line or coke drum; 3) a seat system structured to sheer any coke or by-product material that has accumulated near the valve thus effectively cleaning the valve upon actuation of the valve closure; and b) a structure for actuating the valve closure.

Some embodiments may comprise at least one bonnet. Some embodiments may comprise an upper and lower bonnet coupled to a main body, wherein the bonnet may be removed in order to replace valve parts without separating the main body from the line. Some embodiments may comprise one or more plates located inside a bonnet, wherein the plate(s) comprise a planar surface that may contact one or more surfaces on the blind.

Some embodiments may be utilized as a bottom unheading units, top unheading units, cutting-water isolation valve, overhead vapor isolation valve, blowdown isolation valve, module isolation valve, back-warming isolation valve, fractionator isolation valve, drum bypass isolation valve, heater charge pump discharge isolation valve, inlet isolation valve, switch manifold isolation valve, pre-heat warm up isolation valve, quench water isolation valve, steam isolation valve, and drain-to-pit isolation valve.

In some embodiments the valve may be coupled to and seal against a portion of the lines or coke drum in much the same way a conventional valve would be attached.

In some embodiments the valve or coke drum is equipped with a valve closure that regulates the closing and opening of a line, for example the deheading valve inlet resid feed line and/or the vapor lines, or regulates the opening and closing of the line, for example inlet resid feed line and/or the vapor lines and their associated throughput. When the valve is in a closed position it blocks the flow of matter through the line or from the coke drum. For example, in a closed position the valve blocks the flow of residuum from falling through an opening at the lower end of a coke drum and/or blocks the movement of lighter fractions/steam/gas from exiting an opening at the top of the coke drum.

When the valve is attached to a line or a coke drum and moved into an open position matter is allowed to move through the line or from a coke drum. In some embodiments, this opening action additionally functions to sheer any coke or other debris that accumulates on the valve or near the port thus effectively allowing the valve to be repetitively opened and closed and to maintain a seal. Accordingly, the valve according to some embodiments are structured to allow for reliable use of a valve over an extended period of time without any significant decrease in performance.

Some of the embodiments may be utilized at various points in the delayed de-coker operation. For example, the valve may be used to regulate the flow through bottom unheading units, top unheading units, vapor lines extending from the top of the coke drum to the bottom of the fractionation tower, the inlet resid feed lines as well as being located at other positions throughout the delayed coker unit operation.

Some embodiments of the valve may be structured to isolate gases and hot liquids particularly those utilized in the coker operations. Some embodiments are structured to provide the benefit of allowing for reliable, extended flow isolation and repeated unheading without decreased performance. In some embodiments, maintained high performance over extended periods of time is enhanced by features of the invention including contact between the seats and blind which acts to remove any debris from the internal component of the valve system. In prior art systems the likelihood of coking up or oiling up required frequent rebuilds and therefore removal of valves from a line.

In some embodiments, the main body of the valve may be coupled to an upper and lower bonnet, each of which may be independently removed to replace valve parts without separating the main body from the line. Within the bonnets 30 of some embodiments there may be at least one plate 52 located in opposition to one another which allow the blind 4 to maintain surface contact with the plate(s). The plate/blind 4/52 system located within the bonnets 30 of the present invention prevent the escape of matter from a line into the bonnet 30. Accordingly, some embodiments prevent exposure of the internal elements of the valve system 14 to matter traveling through the line. Consequently, the internal components of a valve system 14 may remain clean and free from debris and build up.

In some embodiments the internal sealing components of the valve 14 may be replaced by removing an upper bonnet 33 while the main body 16 remains attached to the orifice dimension aligned to a particular line or coke drum 22. Accordingly, in some embodiments the valve parts may be replaced without removing the valve 14 from the line.

Some embodiments utilize a structure for supporting a valve closure 4 comprising seat support system 50. Valve closure 4 is referred to in this specification also as gate 4 and blind 4. A seat support system 50 may comprise an arrangement or configuration of seats depending upon the type of valve. In some embodiments the structure for supporting the valve closure 4 comprise a seat support system 50, which comprises a first seat and a second 58, 60 existing on either side of the valve closure 4, wherein the first seat 58 and the second seat 60 may be independent from one another. In some embodiments, the first seat 58 and the second seat 60 may be a pressurized seat cartridge. The first and second seats 58, 60 may comprise of either a static or a dynamic nature, such that one may be static and the other dynamic, both dynamic, or both static. Alternatively, the seat support system 50 may comprise of a single seat situated or disposed between the main body 16 of the valve 14 and the valve closure 4. In this configuration, this single seat applies continuous force to the valve closure throughout its oscillation. In single seat systems the single seat may be dynamic or it may be static depending upon the type of valve and the needs of the system specification and any other contributing factors.

Some embodiments of the valve system may comprise a steam purge system. The steam purge system may utilize pressure valves, a steam purge inlet valve as well as emergency vent valves to control the pressure within the system.

Some embodiments of the valves may comprise an internal gas/liquid containment system that provides or maintains isolation of the fluid including gas within the system. The internal fluid containment system may comprise a metal-to-metal contact seal described herein as well as a unique component configuration existing within the bonnets 30 of the valves 14.

The system of many of the embodiments are structured to automatically and repeatedly unhead a coke drum and/or line without needing repair or replacement. In several embodiments, the valve may be fixed or coupled directly to the line flange and/or to a coke drum. In some embodiments, the system may be structured to ensure long term operation without clogging or being operationally obstructed by coke particles, oil, resid, or any other foreign matter and debris. In some embodiments the system may be structured to demonstrate, with absolute certainty, at all times and at all local and remote locations that it is positively isolating. In some embodiments, the system is virtually maintenance free except for long term parts replacement during scheduled shutdowns. Consequently, there are limited maintenance costs associated with the use of the valve beyond the scheduled maintenance times.

In some embodiments the internal components including the seat systems 50, seats and blind 4 may be inspected, repaired and/or replaced without detaching the main body 16 of the valve from the line. For example the entire valve system 14 does not need to be removed from the line or coke drum to replace any of the elements of the system.

In some embodiments the valve system 14 comprises a steam purged body that utilizes regulates body temperature, and that may be structured to create a barrier against gas, fluid, and solid migration. The steam purge elements of these embodiments prevent the movement of matter into the upper and lower bonnets 30 from the line. Accordingly, the internal components of some embodiments do not become encumbered by coke or oil build up. The internal components require significantly less repair and replacement. Accordingly, some embodiments of the valve operate reliably for extended periods of time without decreased performance.

In some embodiments the valve system 14 may comprise a simple, hydraulic design with one hydraulic power unit and one cylinder, and one supply and one return hydraulic line. Still further, some embodiments comprise a compact hydraulic backup device to allow the valve to open or close even when the primary actuation device has failed.

Some embodiments comprise a simple redundant hydraulic design as described above. Some embodiments of the system also comprise one major moving part instead of multiple moving parts as found on existing devices and systems. This significantly increases the ease of operation, as well as the durability of the system. Moreover, the isolation and containment of the residuum, gases, steam and/or other materials provide a clean operating atmosphere that contributes to the durability and robust nature of the system.

Some embodiments are structured mechanically to oscillate under conditions where valve gate 4 is maintained in a partially opened position. For example, in a delayed coker unit operation the back warming valve is often left in a partially opened position. Because the back warming valve is left in a partially open position the internal components of the valve are exposed to the build up of oil, coke, and/or other debris. In some embodiments the internal components of the bonnet 30 prevent the build up of oil, coker, or debris inside the bonnet 30. Because some of the embodiments have particular design features the internal components of the valve system 14 are not exposed to oil, coke, and/or other build up while the valve 14 is maintained in a partially opened condition. For example, some embodiments of the valve system 14 utilize a steam purge system which creates a positive pressure inside of the bonnet 30 forcing the contents of a line to remain inline and prevent the contents of the line from moving into the internal components of the valve 14.

In some embodiments, there may be additional mechanical features which allow the valve to be maintained in a partially opened position without compromising the performance of the valve over extended periods of time. For example, in some embodiments the seat system 50 maintains continuous contact with the gate 4. The continuous contact in some embodiments, shears accumulated coke and/or other debris preventing the accumulated material from building up upon the valve 14 itself and from falling into the various internal components of the valve system 14. Some embodiments utilize a system, which is located inside the bonnet 30, which maintain contact with the gate 4 of the valve 14 while the gate 4 moves through the open and closed positions. In some embodiments the bonnet 30, preferably the lower bonnet 34 of the valve 14, contains one or more plates 52 which opposably face each other and are biased against the surface of the gate 4 present within the lower bonnet 34. In some embodiments springs coiled and biased against the lower bonnet 34 lie between the bonnet 30 and the plate 4. Accordingly, the spring system of some embodiments press the plate 56 located in the lower bonnet 34 against the surface of the gate 4 as further described below. The plate system located in the bonnet system 30 prevents the movement of gases, fluids, or solid matter from the line into the bonnet 30. Accordingly, the plate system prevents the contents of the line from coming into contact with the internal elements of the gate system 14.

Turning to the Figures of the present invention and a more detailed analysis of some of the embodiments of the invention, FIG. 1 depicts, generally, a petroleum manufacturing and refinery process having several elements and systems present. In addition to these elements, petroleum manufacturing and refinery process 8 further comprises multiple valve systems 14 in positions relative to first and second delayed coke drums 18 and 22, respectively. As mentioned, there are typically at least two coke drums in simultaneous operation so as to permit the ongoing manufacture and refinery of petroleum as well as its coke byproduct. While first coke drum 18 is online and being filled via feed inlet 26, second coke drum 22 is going through a decoking process to purge the manufactured coke contained therein. Lighter fractions, steam and gases are release from the online coke vessel through the vapor line 2a and 2b. Thereafter, when first coke drum 18 has reached capacity, feed inlet 26 is switched to second coke drum 22 that has just previously been purged of its contents, whereby first coke drum 18 is primed for the decoking process where its contents will be purged. This cyclical process, commonly referred to as batch-continuous, allows the refinery to maintain continuous uninterrupted operation.

Figure 2:
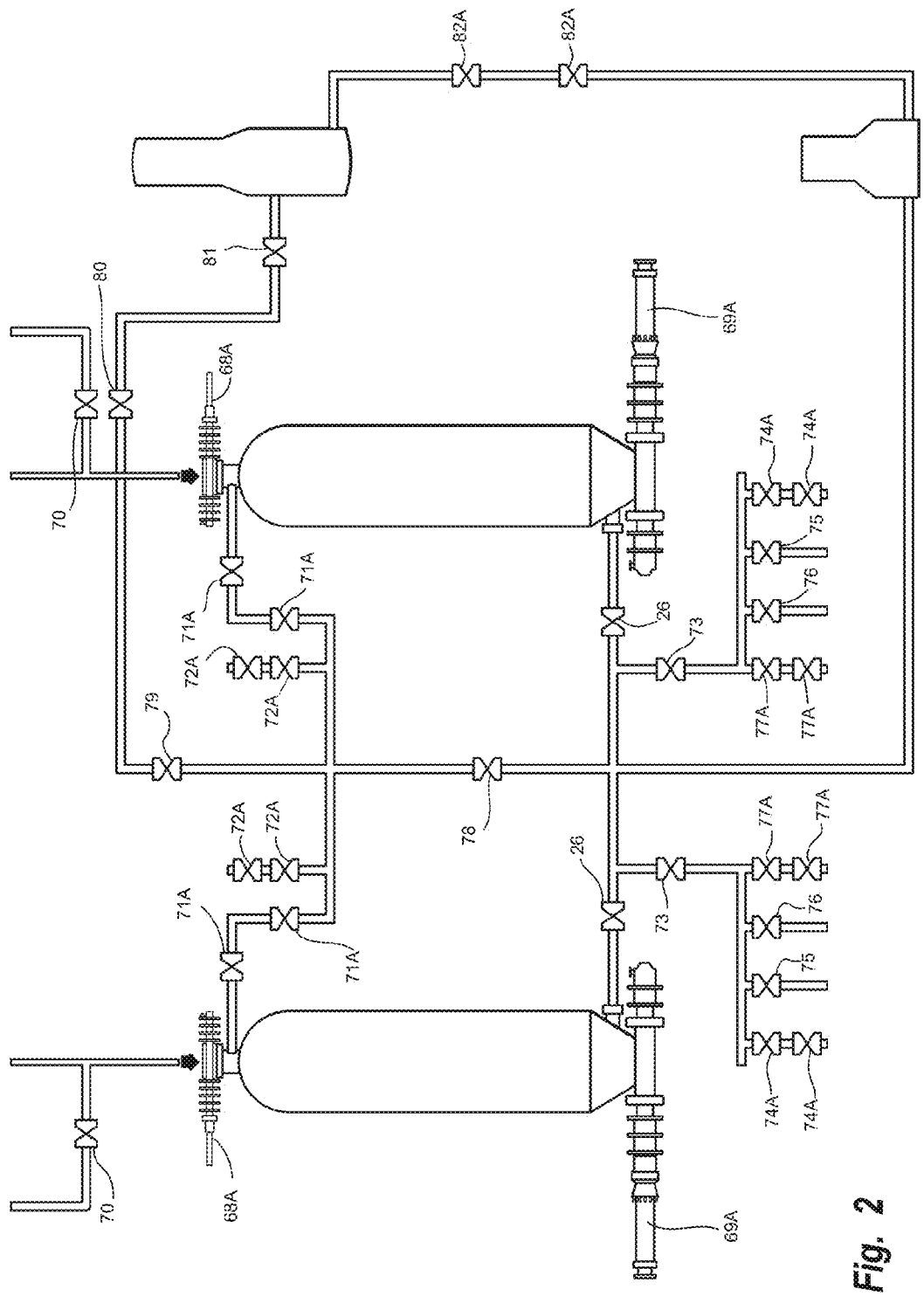
FIG. 2 illustrates an exemplary delayed coker unit operation and identifies several of the positions at which the valves according to some embodiments may be utilized.
Figure 3A:
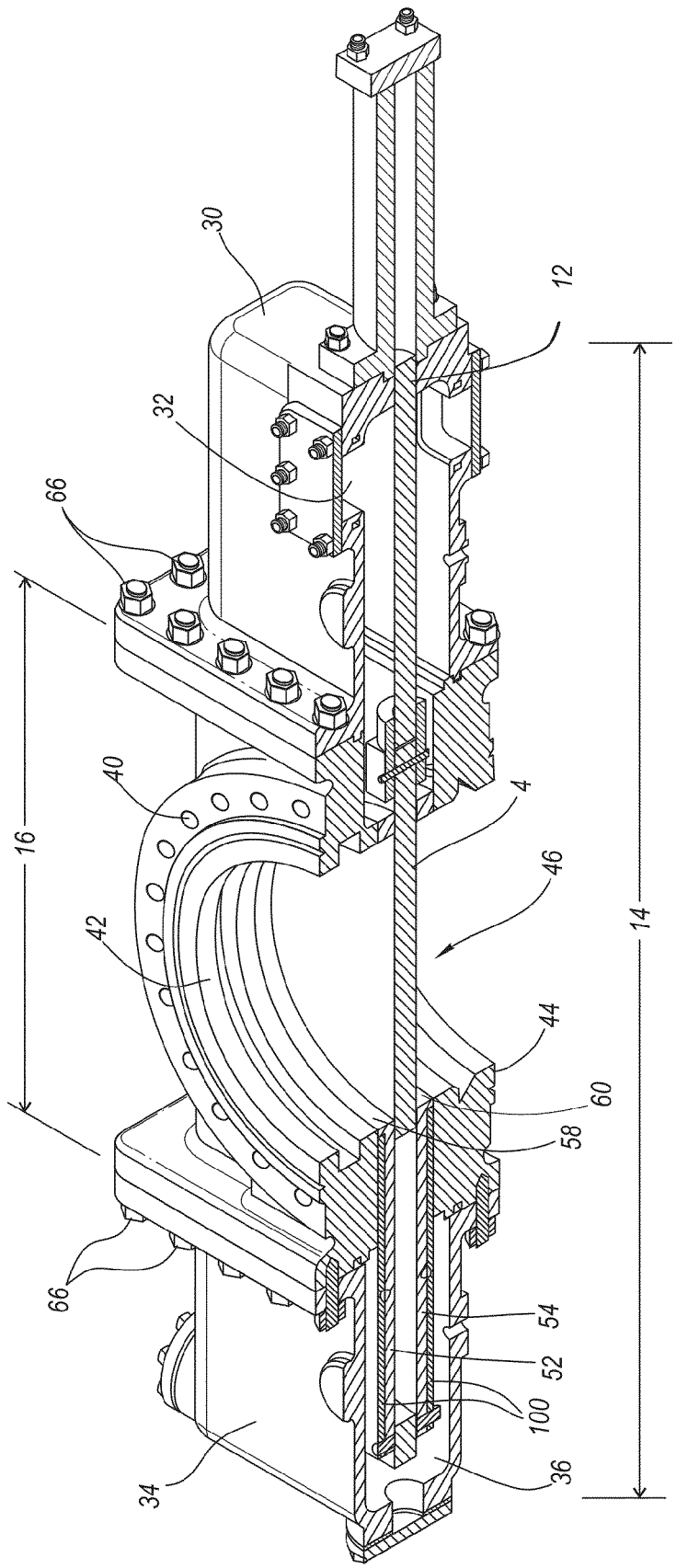
FIGS. 3A-3D illustrate a cutaway of some embodiments of a valve in a closed position.
Figure 3B:
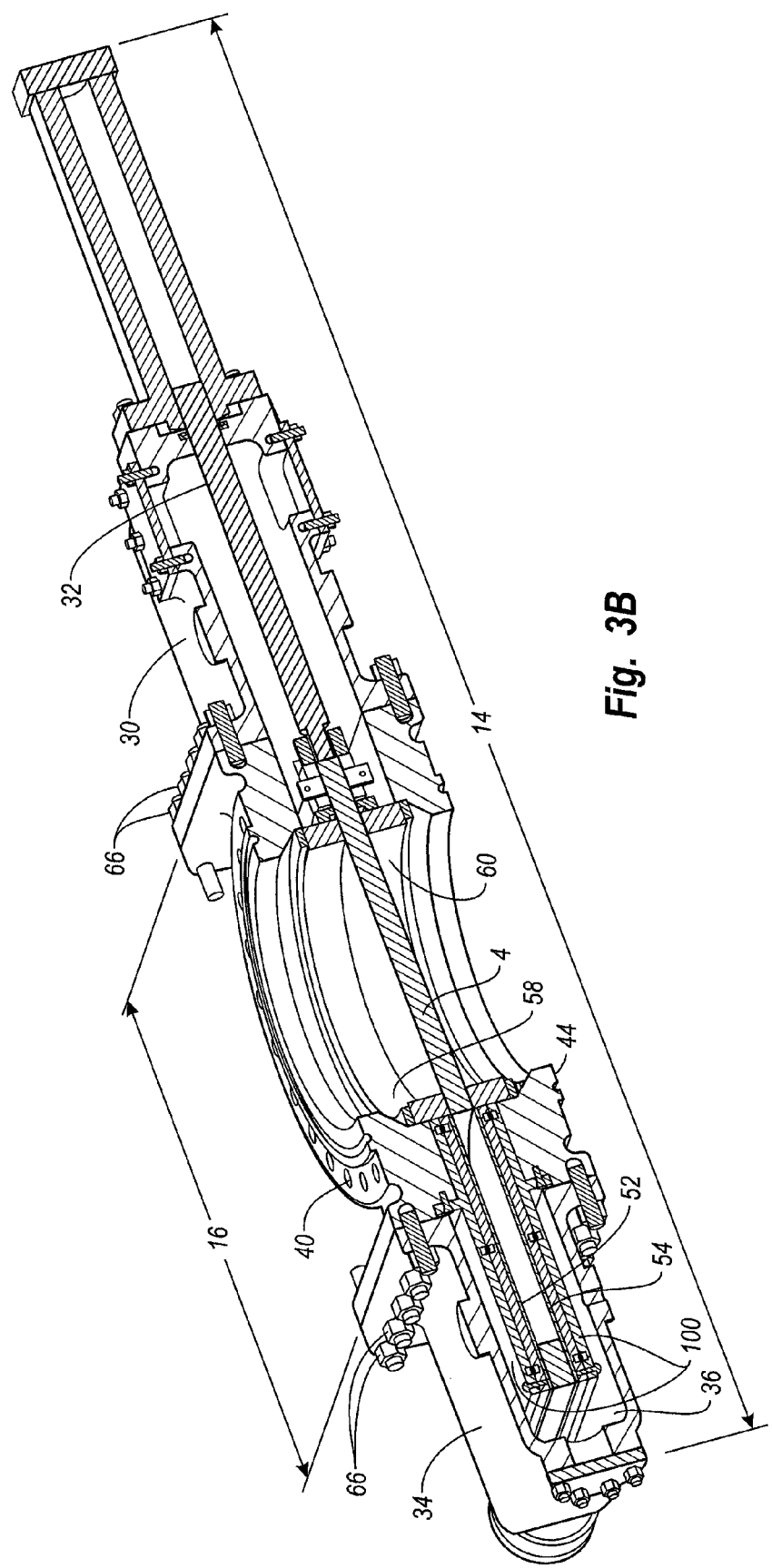
Figure 3C:
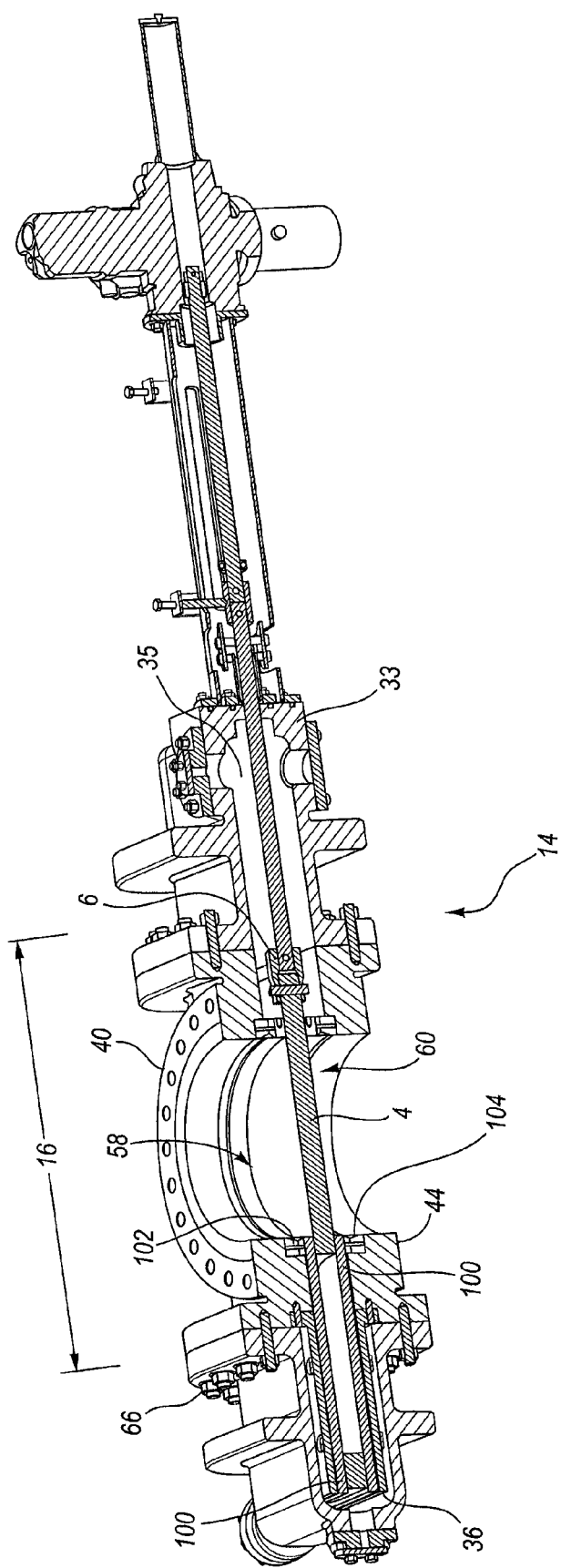
Figure 3D:
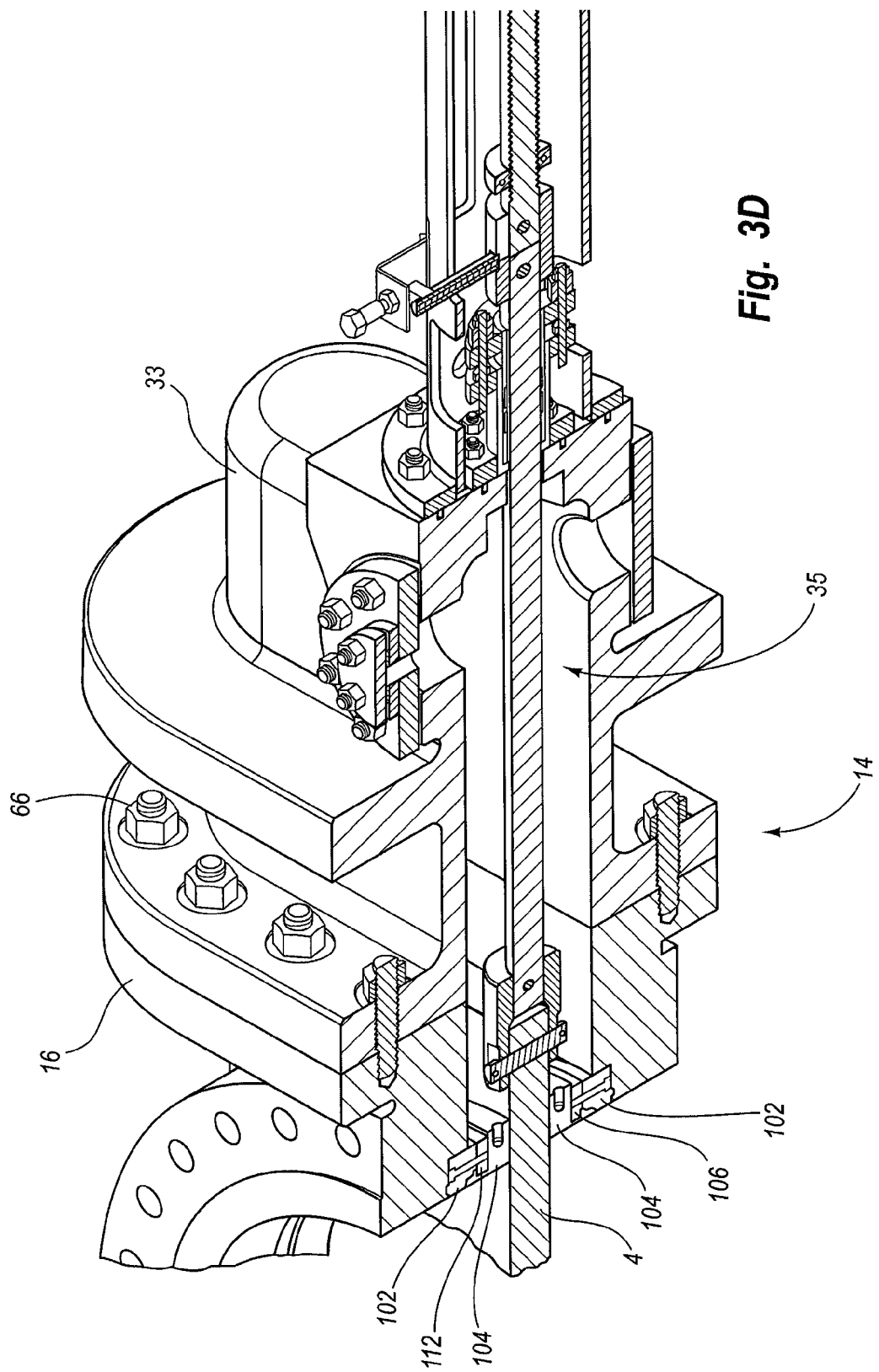
Figure 4A:
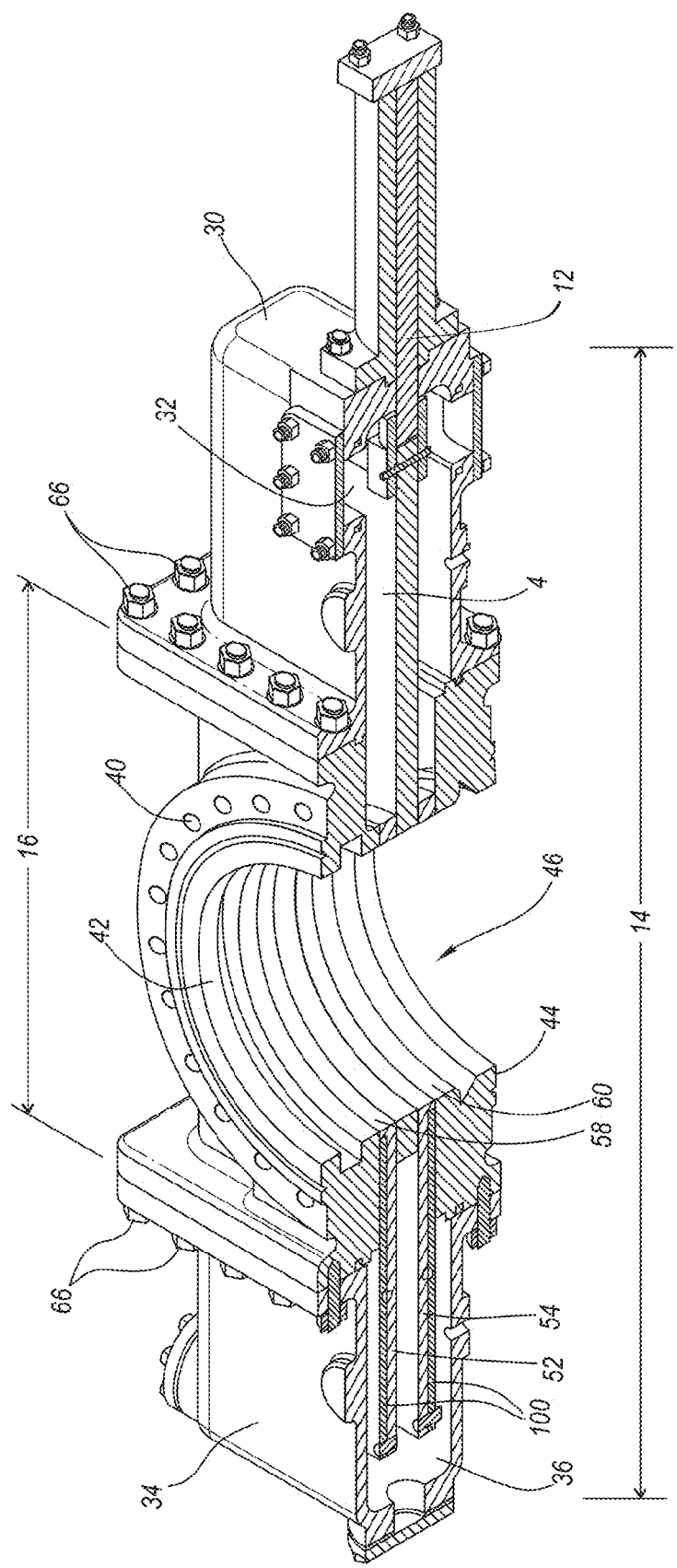
FIGS. 4A-4D illustrate a cutaway of some embodiments of a valve in an open position.
Figure 4B:
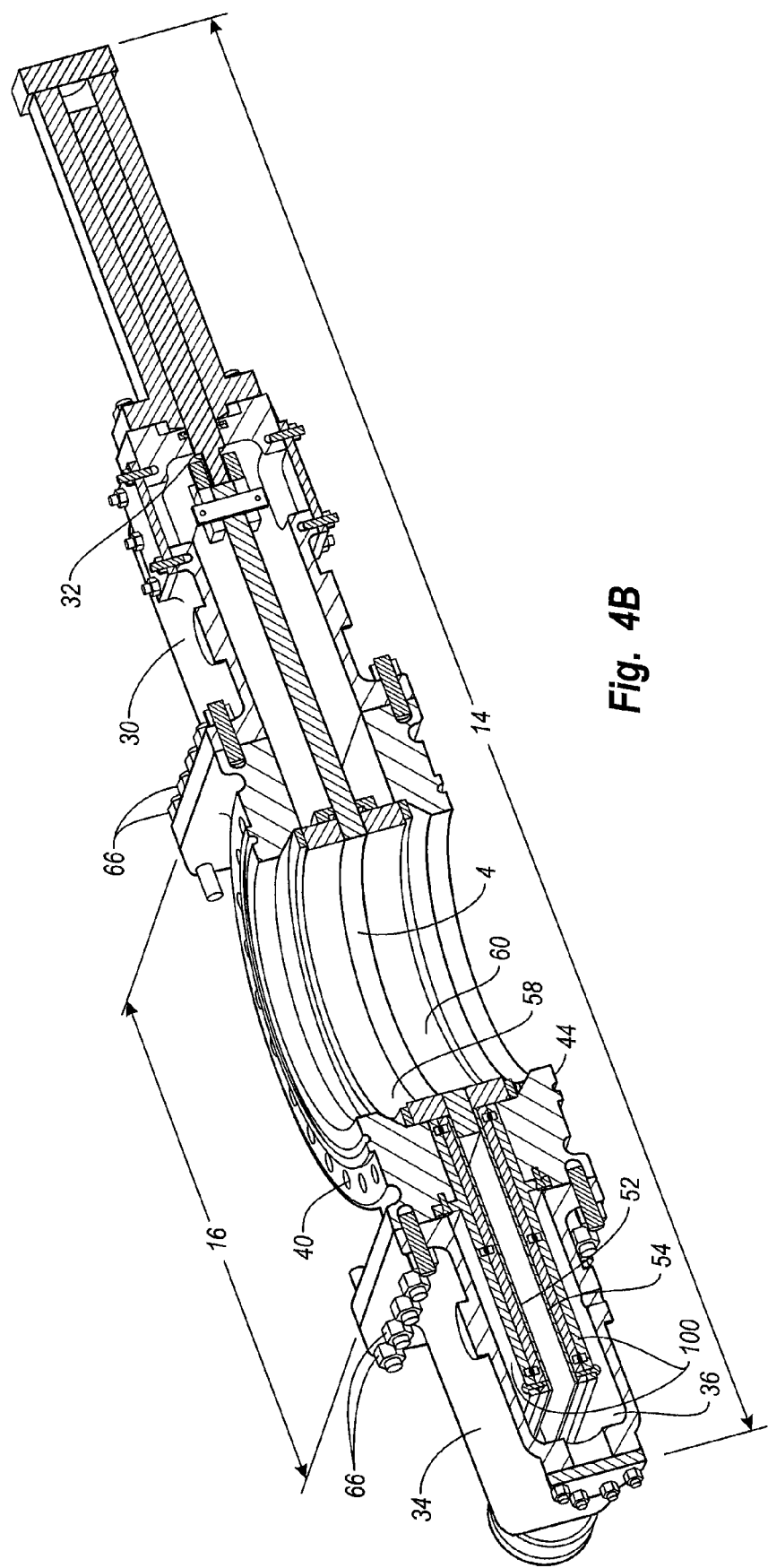
Figure 4C:
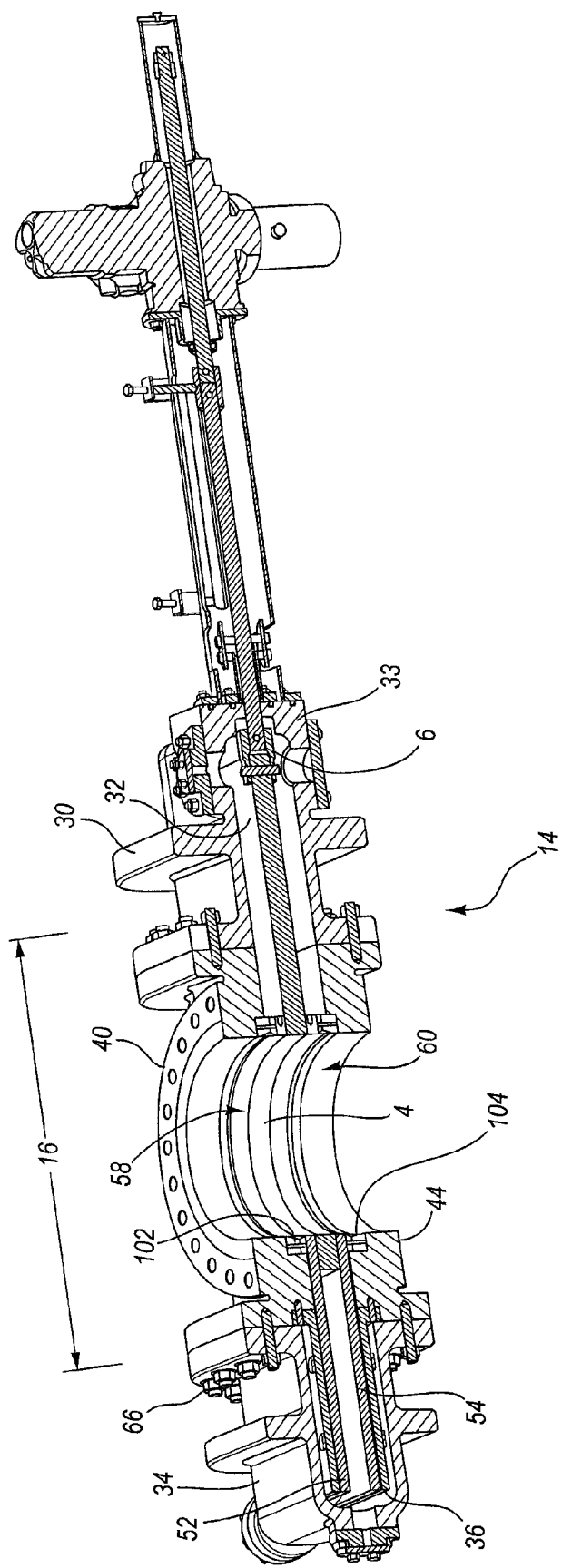
Figure 4D:
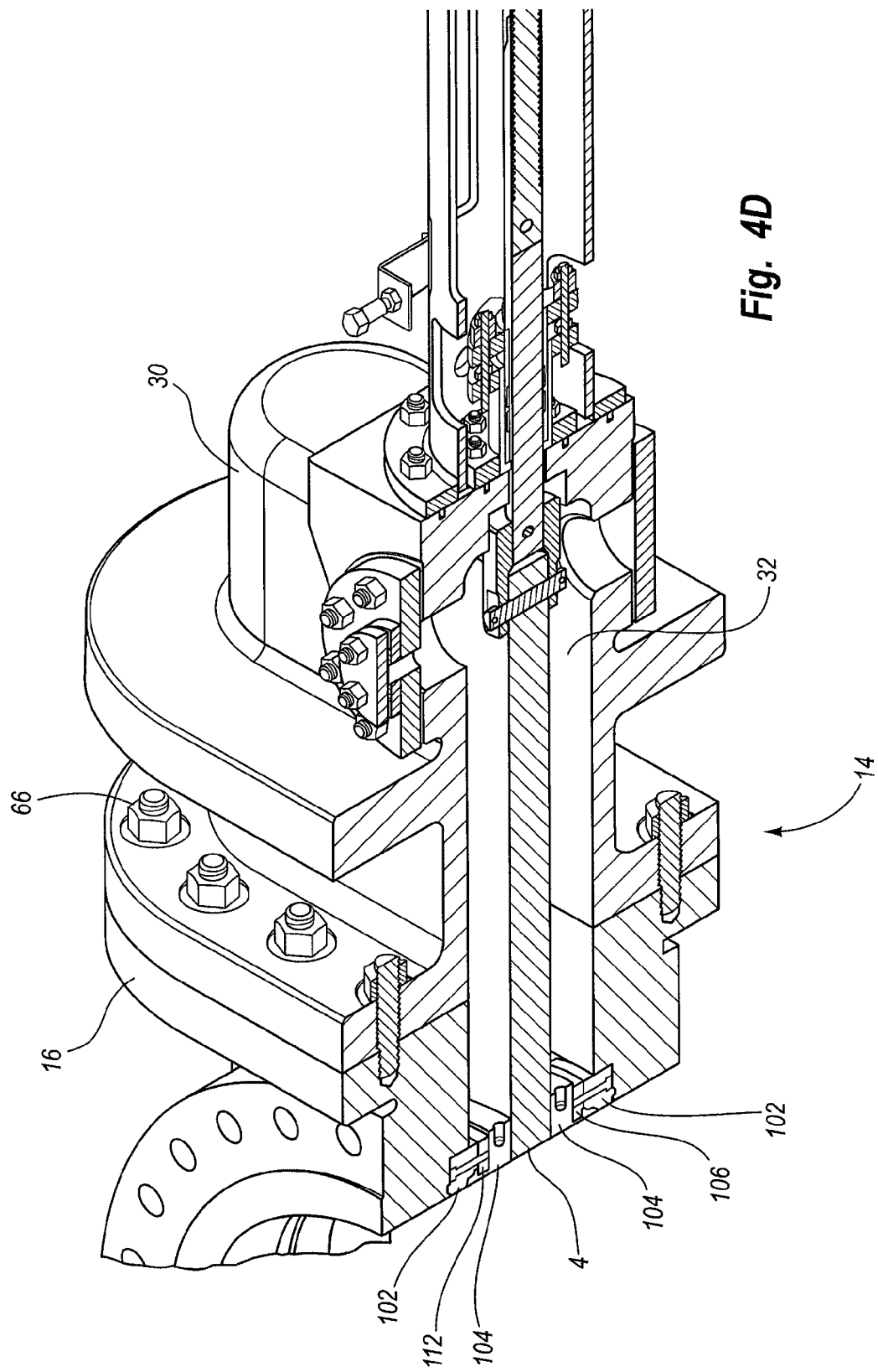

FIG. 2 illustrates an exemplary delayed coker unit operation, highlighting various lines utilized to convey matter, including gases, liquids and solids from one location to another throughout the delayed coker unit operation. In particular FIG. 2 illustrates some of the locations where various embodiments of the valve and/or deheading of the present invention may be utilized. Some embodiments of the valve 14 may be connected to any line or to a coke drum. Examples of some positions where embodiments a valve may be utilized include a bottom unheading unit or deheading device 69A, a top unheading unit or deheading device 68A, cutting-water valve 70, overhead vapor valve 71A, blowdown isolation valve 72A, module isolation valve 79, back-warming isolation valve 80, fractionator isolation valve 81, drum bypass isolation valve 78, heater charge pump discharge isolation valve 82, inlet isolation valve 26, switch manifold isolation valve 73, pre-heat warm up isolation valve 74A, quench water isolation valve 75, steam isolation valve 76, and drain-to-pit isolation valve 77A.

FIG. 3A-3D depicts an embodiment of the valve system in an open position. The depicted valve system 14 is structured to be coupled to a line or coke drum to a flange. In some embodiments, the valve as depicted may be connected one or more of the above described positions in the delayed coker unit operation (see FIG. 2). Each of FIGS. 3A, 3B, 3C and 3D illustrate different embodiments of valves 14.

The valve depicted in FIGS. 3-13 are an embodiment of valves of the present invention, however it is intended that valve 14 may comprise a variety of valve types, and a variety of different elements.

The seat system 50 (e.g., the dual, metal seat surfaces in some embodiments), the bonnet interior 36, and all internal parts are fully protected and isolated from any matter flowing through a line while the valve is in the fully open, fully closed (see FIGS. 4A-4D) or partially opened (see FIGS. 5A and 5B) positions. Preferably, the materials used in the construction of sealing parts are resistant to corrosion, and are designed for exceptionally high metal to metal cycle duty. The seals of the valve 14 are designed to cleanly break the bond between the coke and the exposed surface of the valve closure at each stroke. The total thrust required for this action combined with the thrust required to overcome seating friction and inertia is carefully calculated and is accomplished by actuating the valve closure 4, thus causing it to relocate or transition from a closed to an open position.

FIGS. 3-13 illustrate various views of valve 14, according to various embodiments. The depicted valve 14 comprises a main body 16 coupled to upper and lower bonnets 33 and 34, each comprising lower chambers 35 and upper chamber 36, respectively. Main body 16 comprises a first flange portion 40 having an opening or port 42 therein, and a second flange portion 44 having an opening or port 46 therein. Main body 16 couples 26 to a complimentary flange portion and associated opening or port of a line 2 or coke drum 18 and 22, such that each opening is concentric and/or aligned with one another.

The depicted isolation valve 14 further comprises a valve closure in the form of a sliding blind or gate 4 having an aperture therein that is capable of aligning with openings 42 and 46 in an open position. Valve closure 4 slides back and forth in a linear, bi-directional manner between means for supporting a valve closure, shown in this exemplary embodiment as seat support system 50. Seat support system 50 may comprise any type of seating arrangement, including dual, independent seats, wherein the seats are both static, both dynamic, and a combination of these. Seat support system 50 may alternatively comprise a single seat in support of valve closure 4, wherein the seat may comprise a static or dynamic seat.

In some embodiments, valve closure 4 may be coupled to a drive shaft; preferably the valve closure 4 is coupled to clevis 6, which is in turn coupled to drive shaft 12. Drive shaft 12 is further coupled to actuating structure that functions to power drive shaft 12 and cause valve closure 4 to oscillate between an open and closed position. Actuator structure is preferably a hydraulically controlled power source contained within cylinder and that is capable of moving valve closure 4 through its linear, bi-directional cycle during a coking process, and specifically for the purpose of isolating the flow of fluids, gases and solids. Actuating structure may also be an electric motor. In a closed position, valve closure 4 seals off the opening of a given line or coke drum. Portions of gate 4 extend into upper chamber 32 in the closed position to allow the solid part of gate 4 to cover and close off the opening in the valve. The contact seal created between the surface of valve closure 4 and seat support system 50, is such that any accumulated coke on gate 4 is sheared off. Continued actuation causes valve closure 4 to relocate to a fully open position. In its fully open position, valve closure 4 is retracted into chamber 32, thus providing a clear flow path for the materials through a given line or from a coke drum 18.

In one embodiment it is preferable that a continuous contact seal be created between valve closure 4 and seat support system 50, such that during the back and forth sliding or rotation of valve closure 4 from an open position, to a semi-opened position, and finally to a closed position, with respect to the line, the created contact seal is never broken or breached, but its integrity is maintained at all times. This continuous contact seal is preferably a metal to metal contact seal that performs several functions and has several advantages. For example, the contact seal creates, or at least contributes to, valve 14 isolation, wherein an isolated environment is provided, such that no material is allowed to escape outside the sealed area and into the bonnets 30 or other parts of the valve 14, the area outside the valve, or other areas. Various steam purge systems and containment systems may also function to regulate pressure within the isolation valve 14, to contain the material within designated areas, and to maintain valve isolation. As another example, the continuous contact seal may help to keep various components of the isolation valve clean and free of the product material as these materials are not allowed beyond the sealed area. As another example, as a result of the load exerted upon valve closure 4 and resulting tight tolerances existing between valve closure 4 and first and second seats and the rotation of valve closure between first and second seats 58, 60 causes a burnishing and polishing effect to occur.

In some embodiments, seat support system 50 comprise first and second seats 58, 60 as well as valve closure 4 may be made of metal, thus providing a metal to metal contact or metal to metal seal, or otherwise referred to as metal to metal seating of valve closure 4. The metal to metal seating increases the durability of the system as there are no non-metal parts, such as vinyl or rubber, used to seal the seats to valve closure 4. Metal to metal seating allows the system to achieve a higher consistency of sealing, while at the same time providing extended wear and durability. In addition, the metal to metal sealing allows the system 14, and specifically the sealing within the system, to be fine-tuned as needed.

As the valve closure 4 is actuated and rotated from a closed position to an open position, the contact seal existing between the surface of valve closure 4 and the surface of means for supporting a valve closure functions to break up or shear the manufactured coke that has accumulated on or near the surface of valve closure 4.

FIG. 4A-4D depicts various embodiments of a valve in an open position. The elements of the valve depicted in FIGS. 4A-4D are similar to those disclosed in FIG. 3A-3D. However, FIG. 4A-4D demonstrate the valve closure when slid or rotated into a fully open position wherein the opening in the valve closure 4 is aligned with the opening in the first and second openings in the main body of the valve respectively 42 and 46.

Figure 5A:
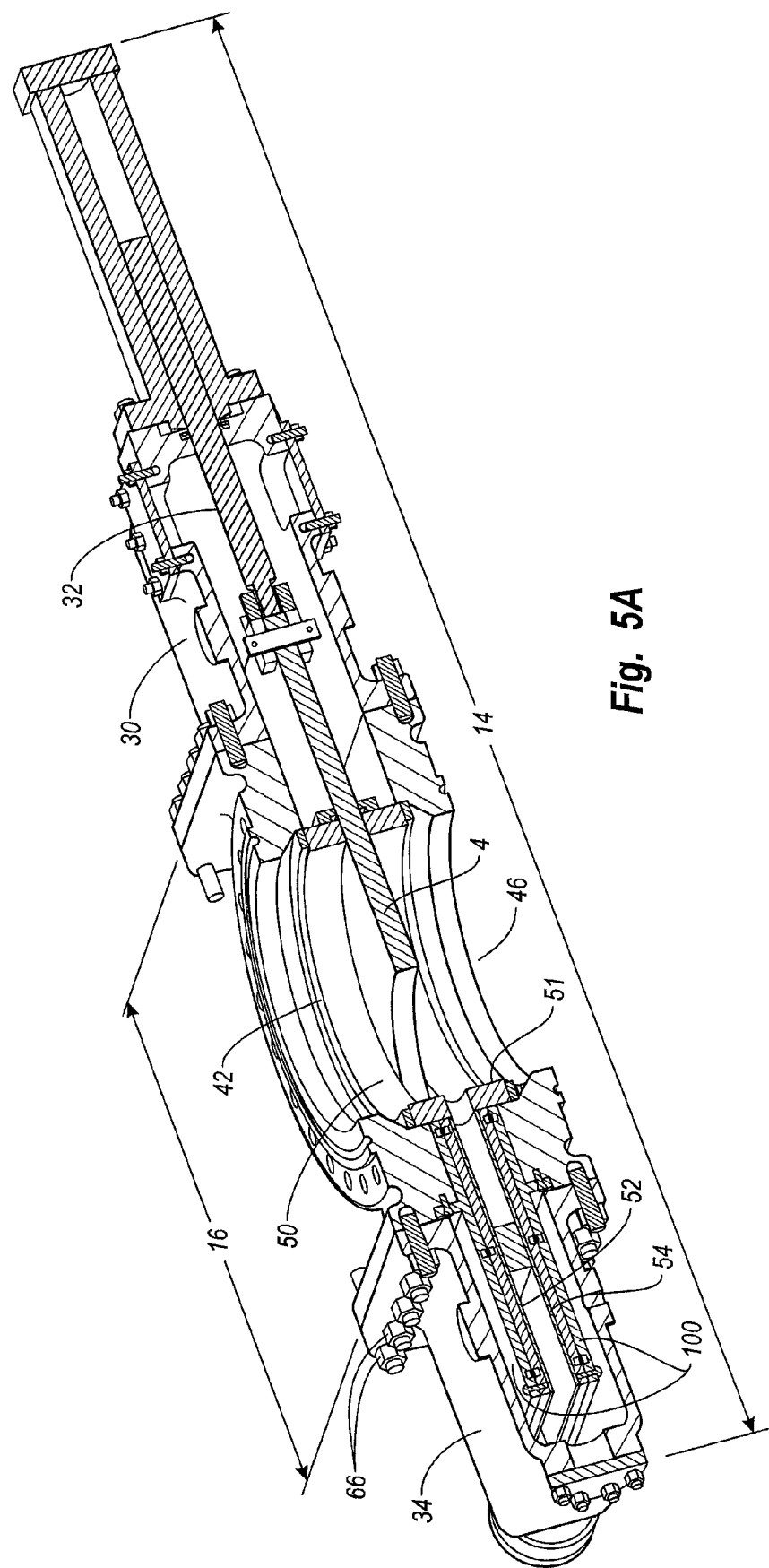
FIGS. 5A and 5B illustrate a valve in a partially open position according to some embodiments.
Figure 5B:
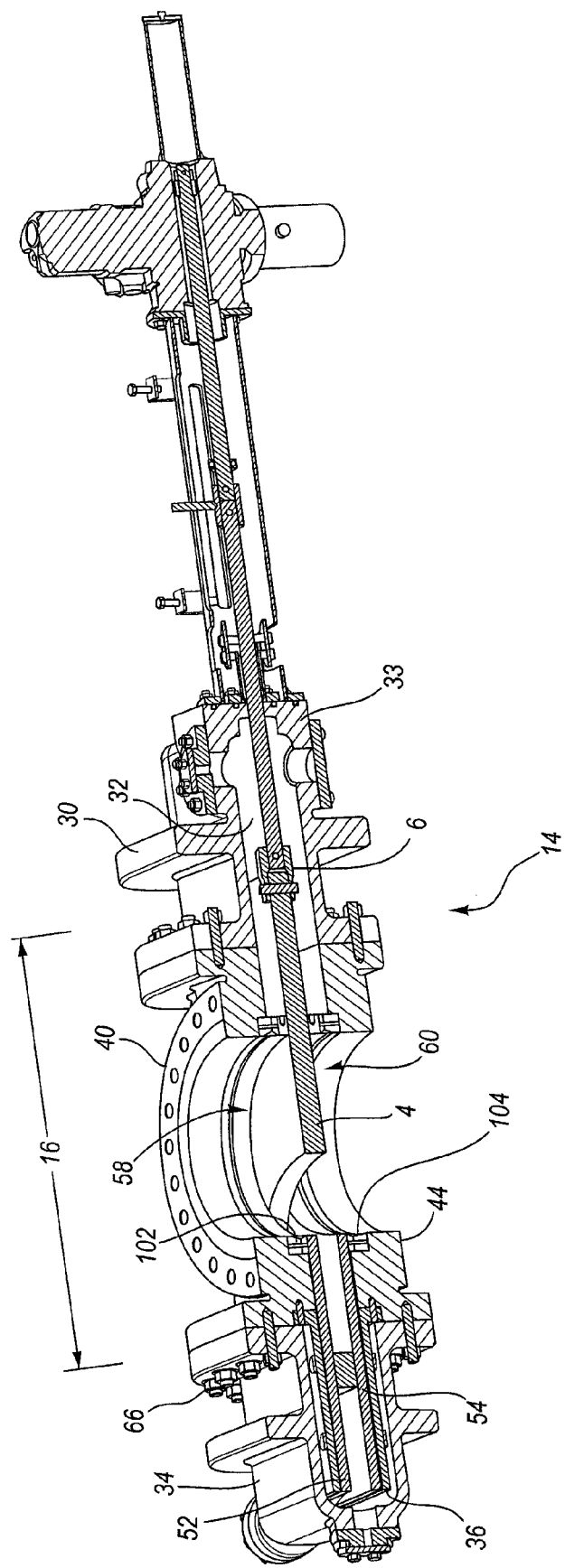

FIGS. 5A and 5B illustrate various elements of some embodiments of a valve system, in a partially open position.

FIG. 6 depicts the slightly beveled end 98 of the valve closure system which inserts into the lower chamber 36 inside of the lower bonnet 34. The beveled edges 98 of the valve closure allow the valve closure to slide easily between two plates 52, 54. The two plates may be made from a variety of materials. In some embodiments, the two plates 52 and 54 are made from metal, and are preferably made from bronze or brass. The plates 52 and 54 are forced into contact with the valve closure 4. In some embodiments the plates 52 and 54 are forced into contact with the valve closure 4 by a spring actuated mechanism 56 which is loaded against the frame of the lower bonnet. In some embodiments the plates 52 and 54 are forced into contact with the valve closure 4 by a spring actuated mechanism 56 which is loaded against an internal shroud 100. In some embodiments the bonnet system, comprising plates 52 and 54, provide a contact seal with the lower end of the valve closure 4, which prevent any gas or fluid materials from escaping into the lower bonnet 34 of the valve closure 4 system from the line. In some embodiments, the first plate 52 and second plate 54 maintain a continuous seal with the valve closure 4 even when the valve closure is in a fully open position. That is in some embodiments, a portion of the valve closure 4 remains inside of the lower bonnet as depicted in FIG. 6. In some embodiments, the plates 52 and 54 may also, or alternatively, be located in the chamber 35 located inside upper bonnet 33.

FIG. 7 illustrates various elements of an embodiment of a valve. In particular, FIG. 7 illustrates the first 53 and second 54 plate, relative to the valve closure 4 when the valve closure is in a closed position. FIG. 7 illustrates a valve closure 4, which has isolated or blocked the flow of any gas liquids and/or solids flowing through a line. FIG. 7 illustrates valve closure 4, a first plate 52, a second 54 and a spring actuated system 56. As illustrated, the opening in valve closure 4 is fully enclosed in the lower bonnet and is pressed between the upper plate 52 and the lower plate 54, thus maintaining an enclosed system which does not allow gas, liquids and/or solids to escape from the line into the bonnet.

FIGS. 6 and 7 additionally illustrate the relationship existing between the seat support system 50 which is comprised in some embodiments as depicted in the figures, of a first seat 58 and a second seat 60, the main body 16 of the valve and the valve closure 4. As previously noted, the seat system may be structured to maintain contact with the valve closure 4 and prevents any gas, liquid and/or solid from moving into the upper or lower bonnet.

FIGS. 8A-I and 9A-E illustrate an embodiment of the method of removing internal components of the valve and associated structures according to some embodiments. Some embodiments utilize a simplified method for replacing the first 58 and second seats 60. As depicted in the figures of the present invention the method for replacing first 58 and second seats 60 comprises the steps of removing the attachment means 66 which attaches the upper bonnet 33 to the main body of the valve 16. Attachment means 66 are depicted as a nut and bolt system. While the nut and bolt system are a preferred embodiment, and thus depicted, it is contemplated that various attachment means may be utilized to couple the bonnets of the present invention to the main body. When the attachment means 66 have been removed, the upper bonnet 33 may be displaced or separated from the main body of the valve 16. When the upper bonnet 33 is separated from the main body of the valve 16, the first and second seats 58, 60 and gate 4 are exposed through an opening in the main body 16. Accordingly, in some embodiments the removal of the upper 33 or lower 34 bonnets allows the internal elements of the valve to be visually inspected by operators present in the area. Additionally, in some embodiments the removal of the upper 33 and the lower 34 bonnets allows a space through with various internal elements of the valve may be moved for the sake of repair, replacement or merely for inspection. In some embodiments the gate 4 may be removed through the space formerly occupied by the upper bonnet 33. In some embodiments the first and second seats 58, 60 may be removed one at a time and replaced by new seats through the space formerly occupied by the upper bonnet 30. Each of the seat types previously discussed are amenable to being removed from the valve through the space formerly occupied by the upper bonnet 33. Other elements contained within the valve system may likewise be inspected, repaired, removed and replaced through the opening created when the upper bonnet 33 is removed from being attached to the main body 16. In some embodiments, the main body of the valve 16 may remain coupled to a line and/or a vapor line while replacement of various parts is accomplished.

Figure 8A:
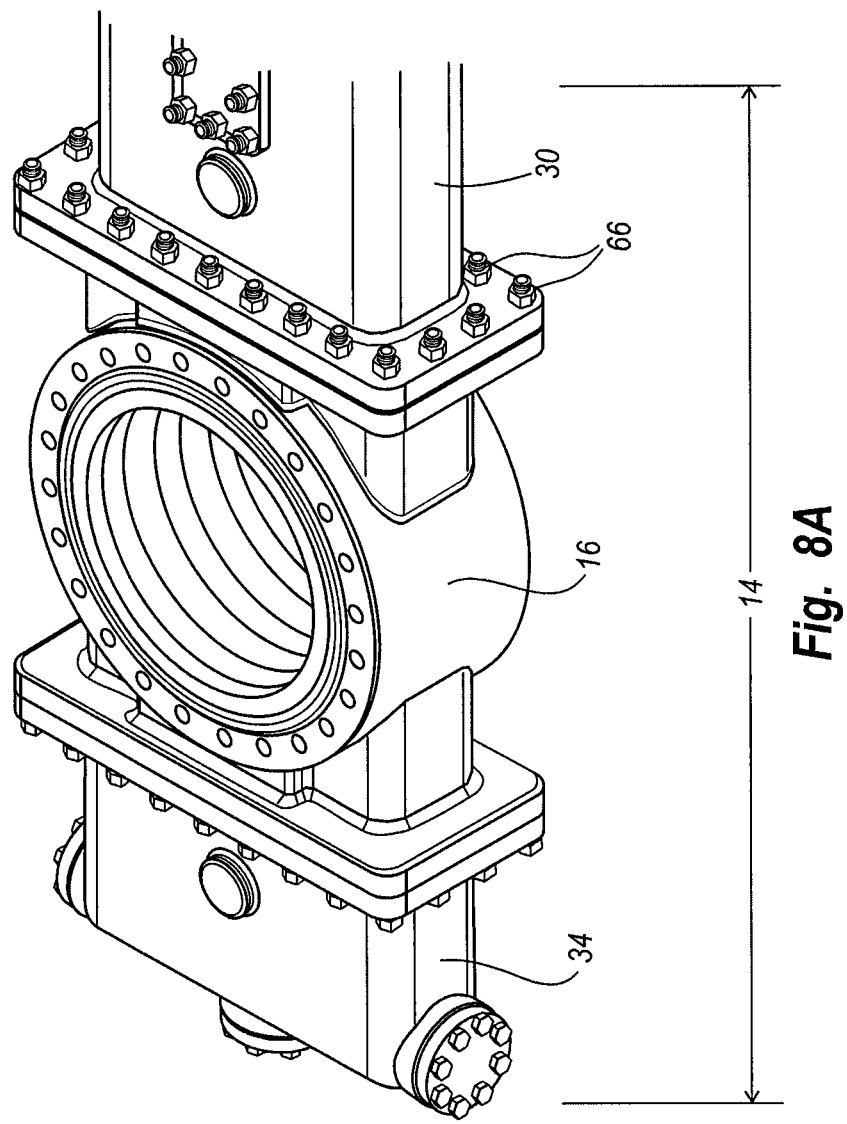
FIGS. 8A-I illustrate an embodiment of a method for removing internal components of a valve.
Figure 8B:
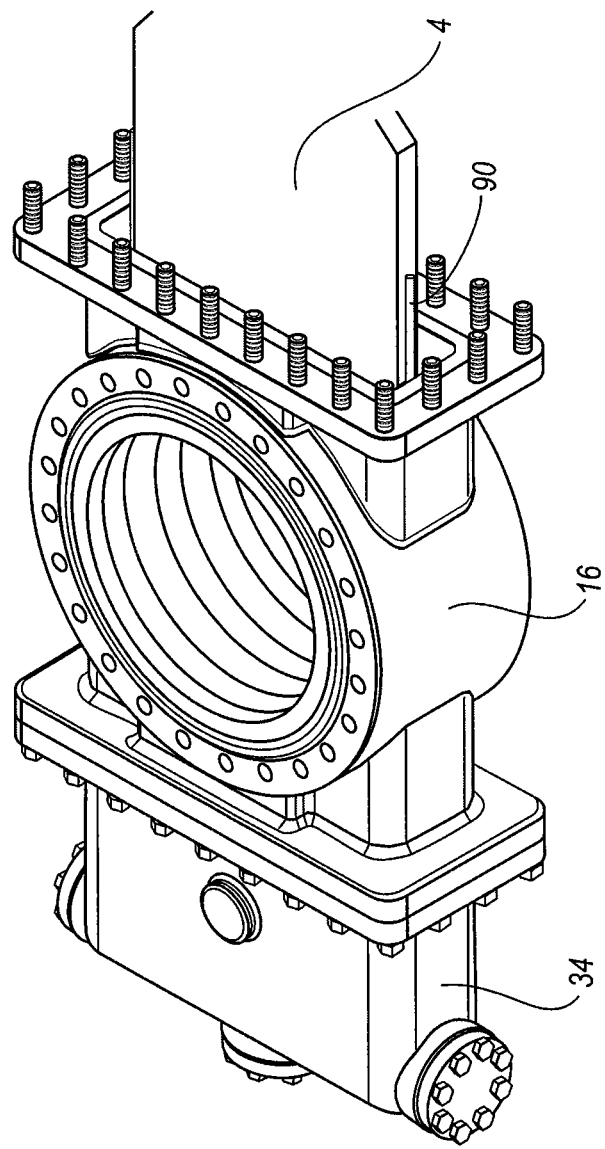
Figure 8C:
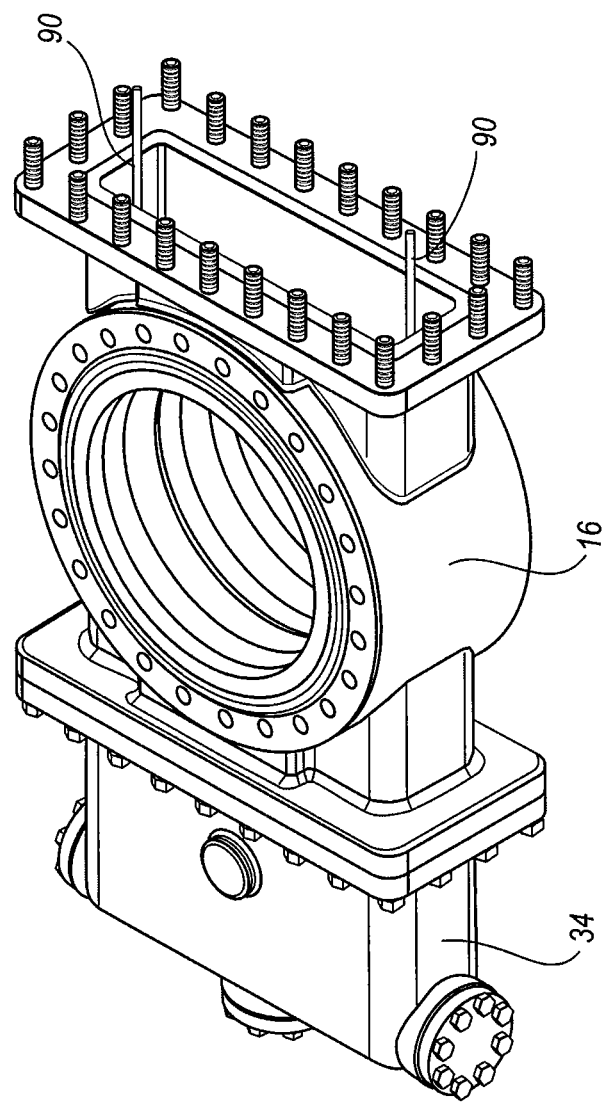
Figure 8D:
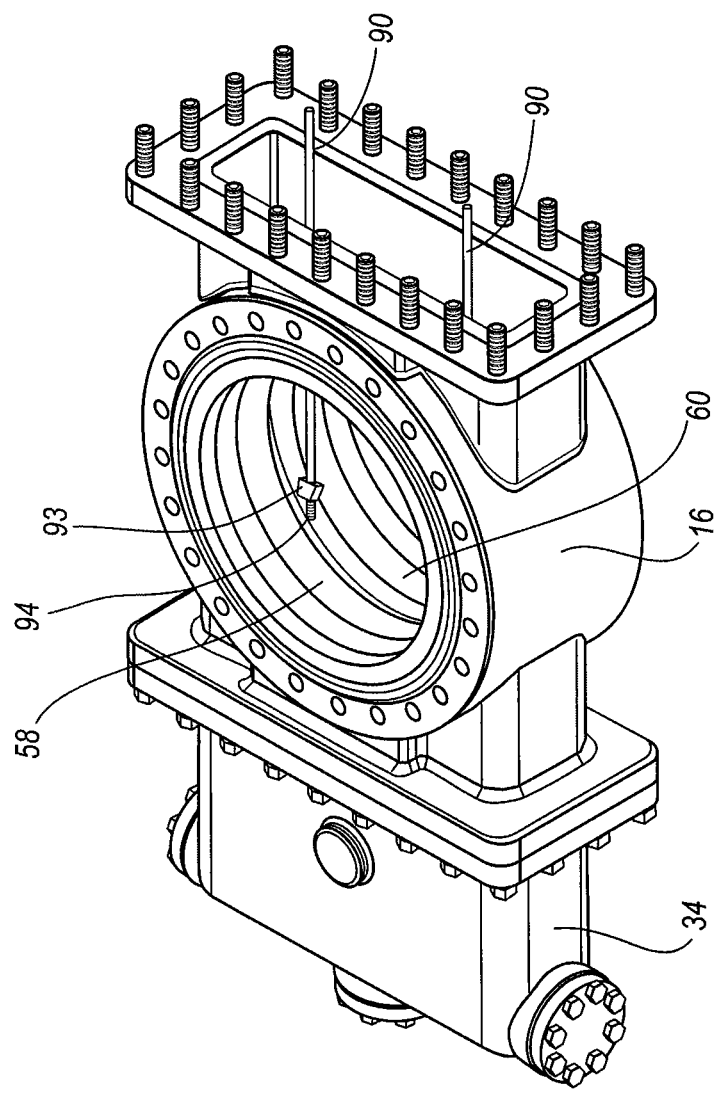
Figure 8E:
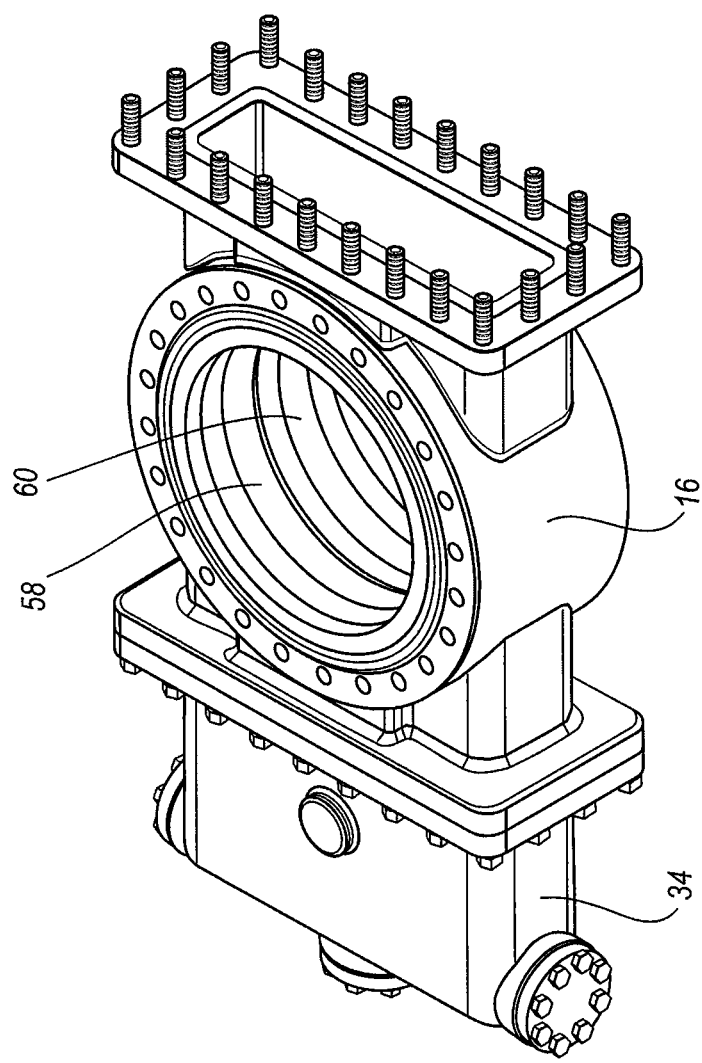
Figure 8F:
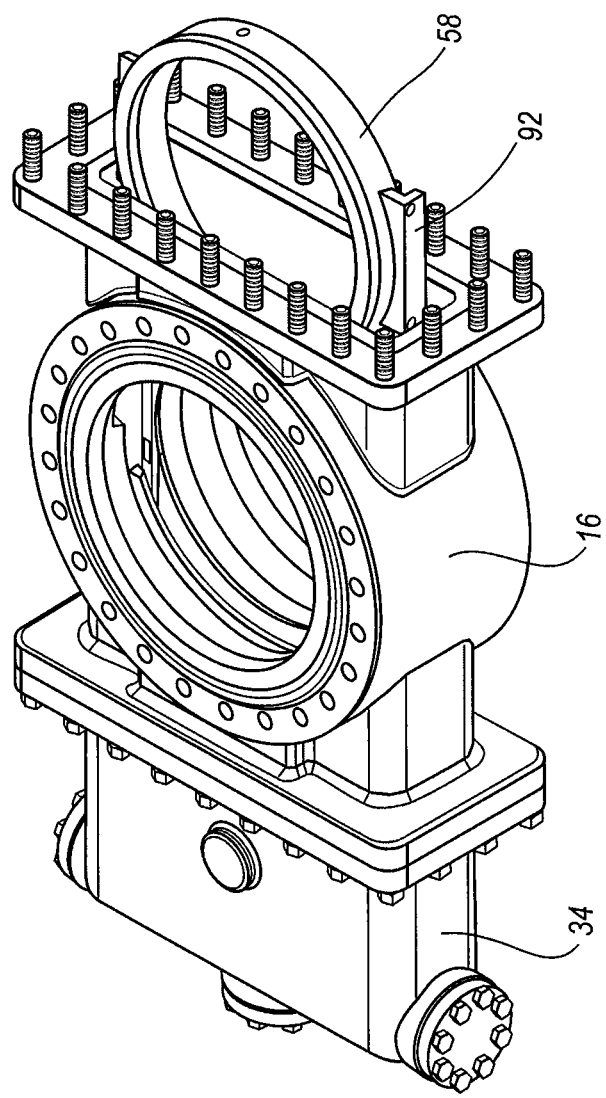
Figure 8G:
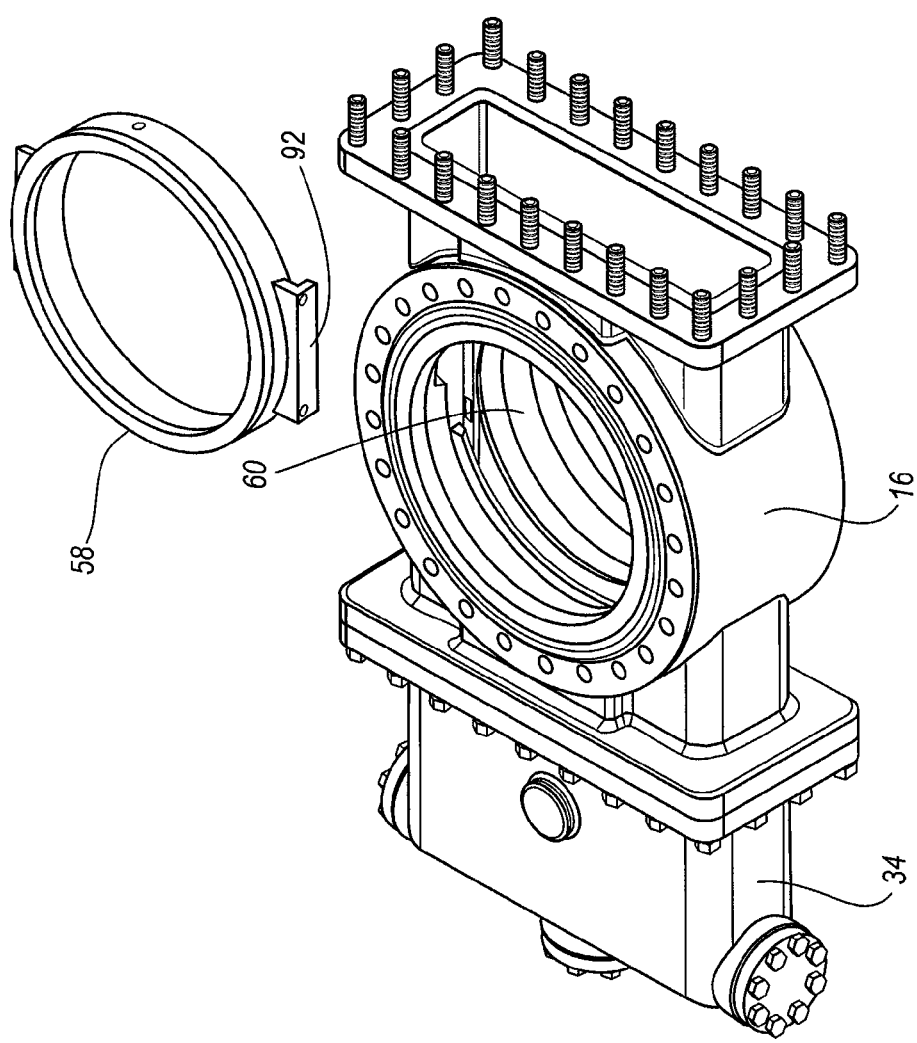
Figure 8H:
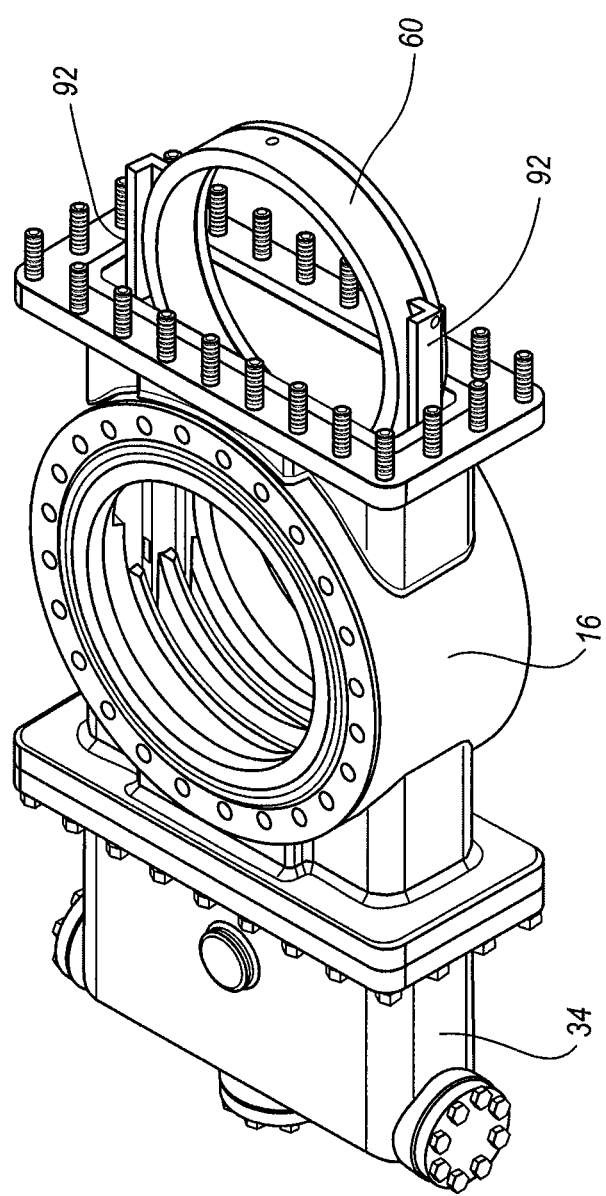
Figure 8I:
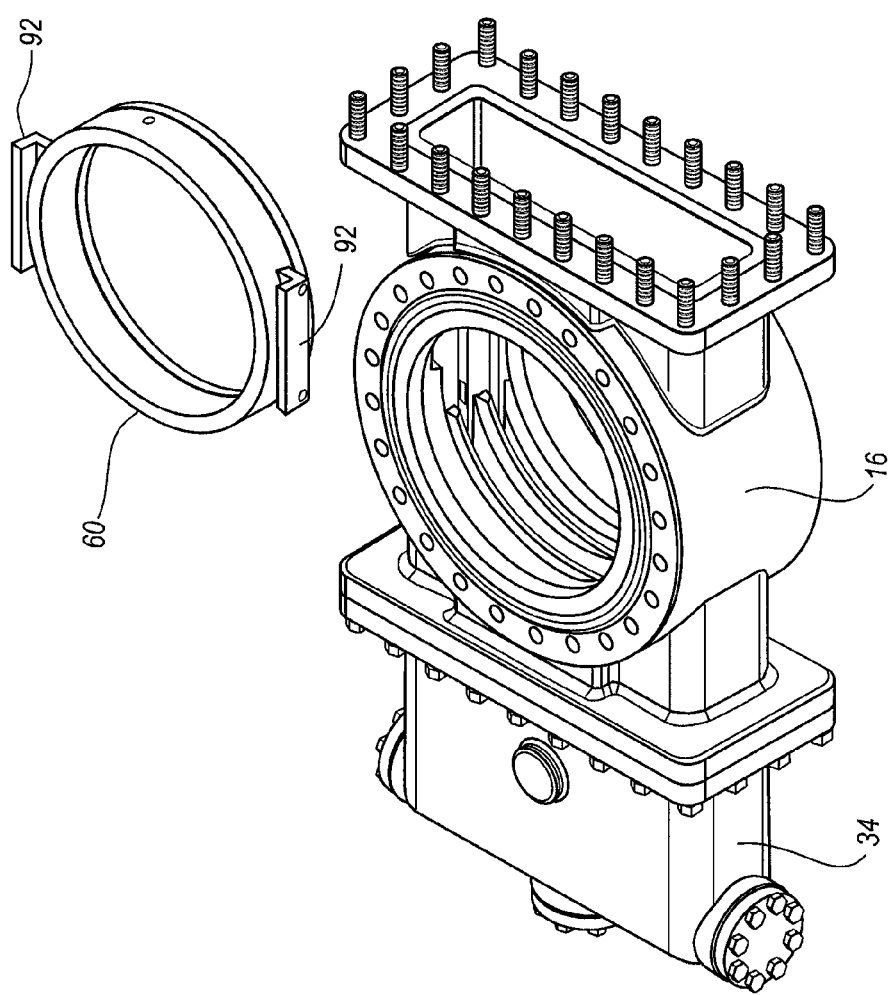

In some embodiments, an extraction tool 90 is utilized in the method of removing internal elements of the valve. In some embodiments the seats 50 have a notch 91 to which a block 92 bolted. The extraction tool 90 interfaces with a slot 95 the block 92 which has been bolted to the seats 50. The extraction tool 90 is comprised of a wedge 93 and a threaded shaft 94. In some embodiments, the extraction tool may further comprise a means for rotating the threaded shaft 96. In FIG. 8C the means for rotating the threaded shaft 96 is depicted as a six sided hex nut that could be rotated by a tool (e.g., a wrench) that would allow an operator to apply additional torque to the threaded shaft. In some embodiments, the means for rotating the threaded shaft may be a handle coupled to the shaft (not depicted) or any other means of applying additional torque to the threaded shaft. The wedge 93 is operationally connected to or interacts with the block 92, which has been bolted to the seats such that when the threaded shaft 94 is turned in one direction the wedge 93 effectively dislodges the a seat 58, 60 from the main body of the valve 16, and if the threaded shaft 94 is turned in the opposite direction the wedge 93 helps to couple one or more seats 58, 60 to the main body 16 of the valve. Some embodiments of the valve may be assembled completely from the top. In some embodiments of the valve the extraction tool 90 remains in the valve without affecting the operation of the valve.

Figure 9A:
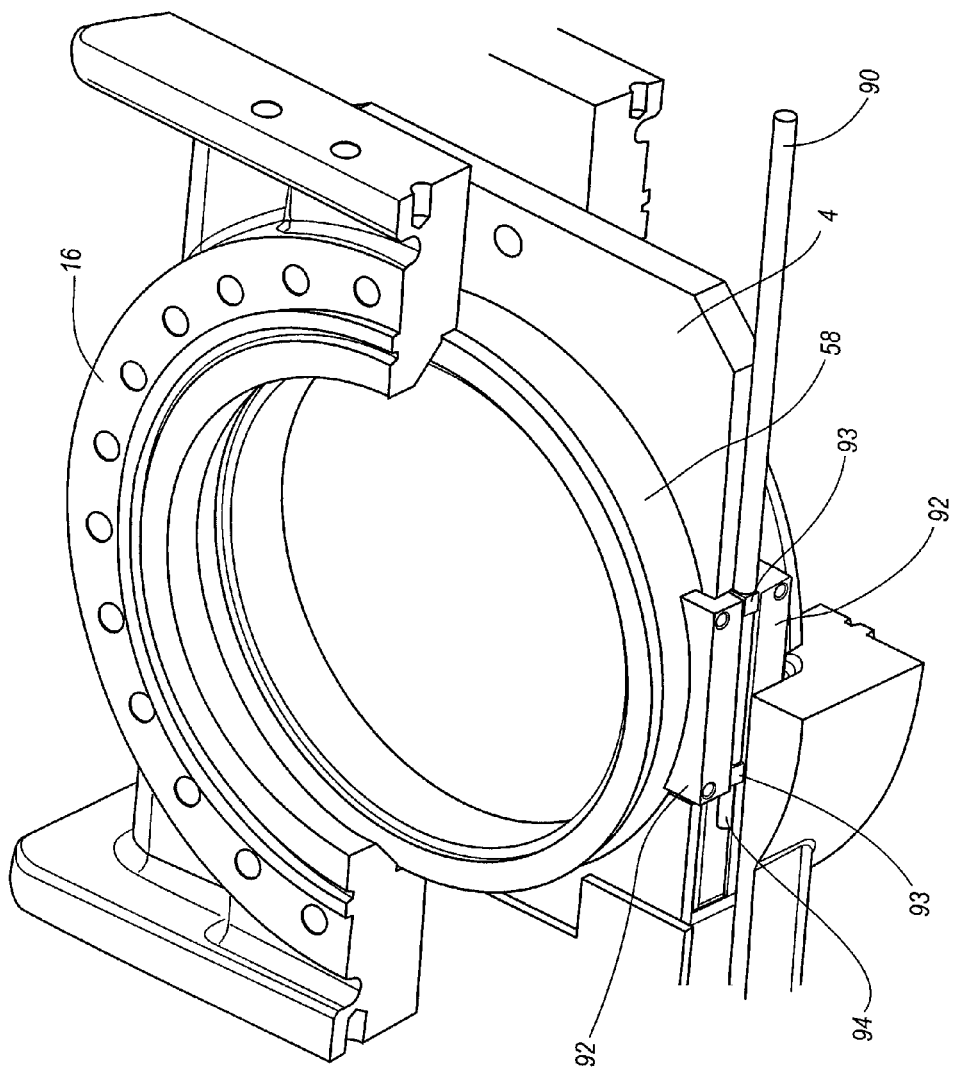
FIGS. 9A-E illustrate an embodiment of a system for removing internal elements of a valve.
Figure 9B:
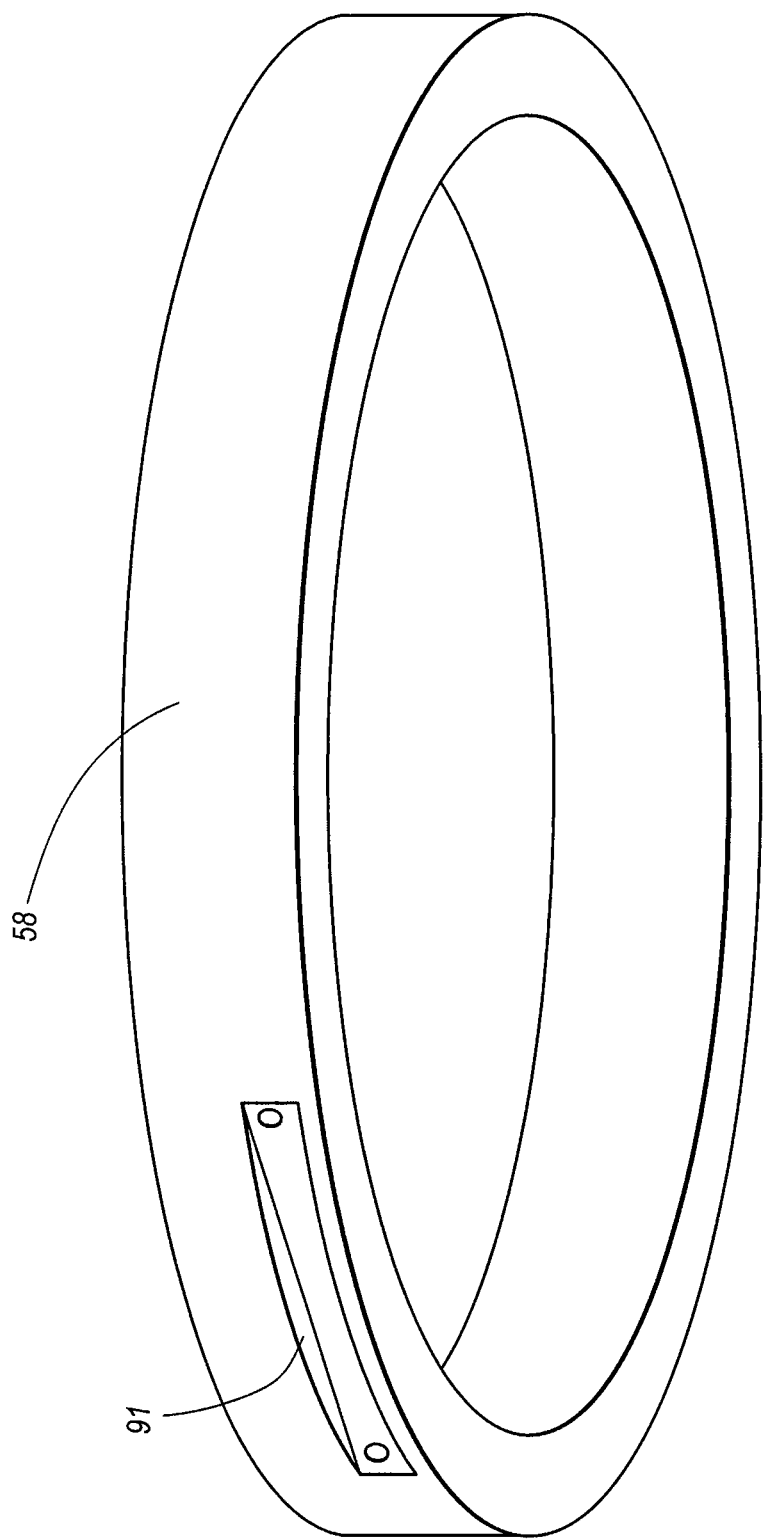
Figure 9C:
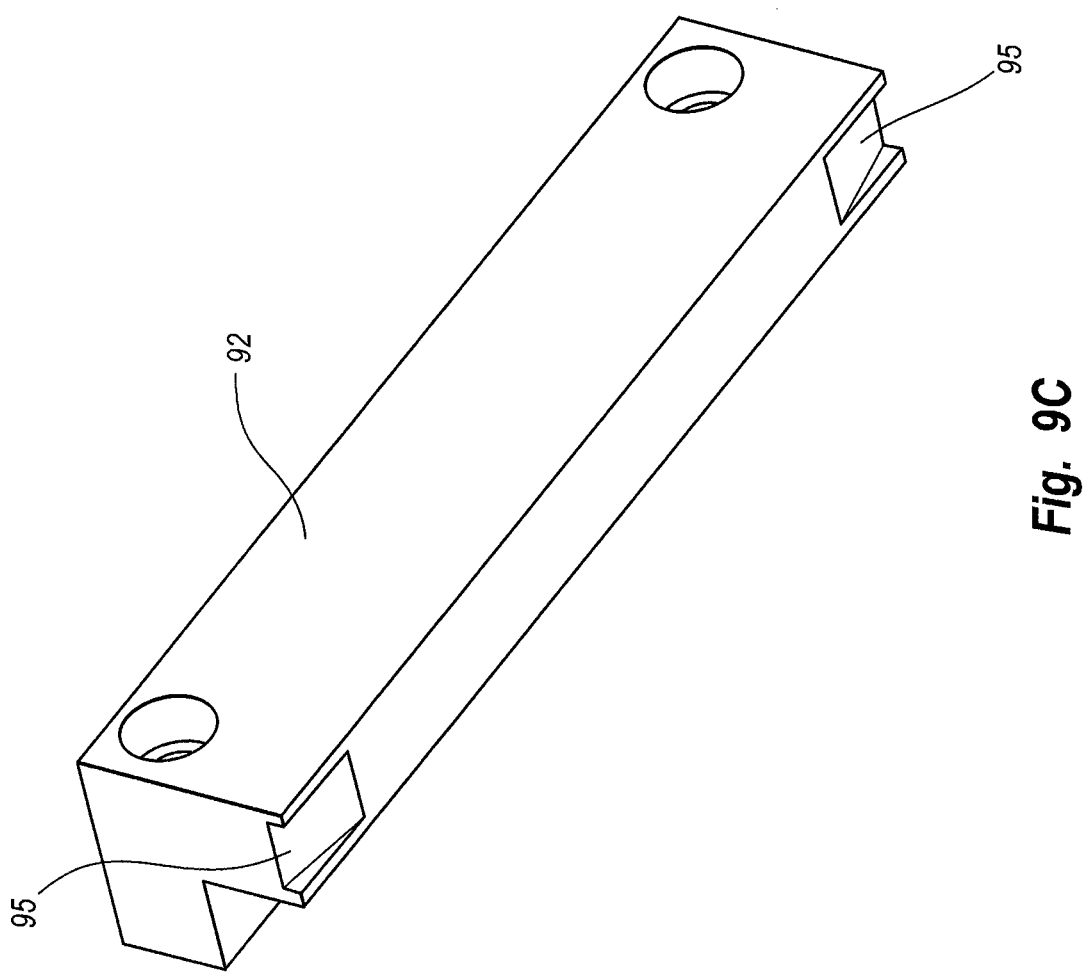
Figure 9D:
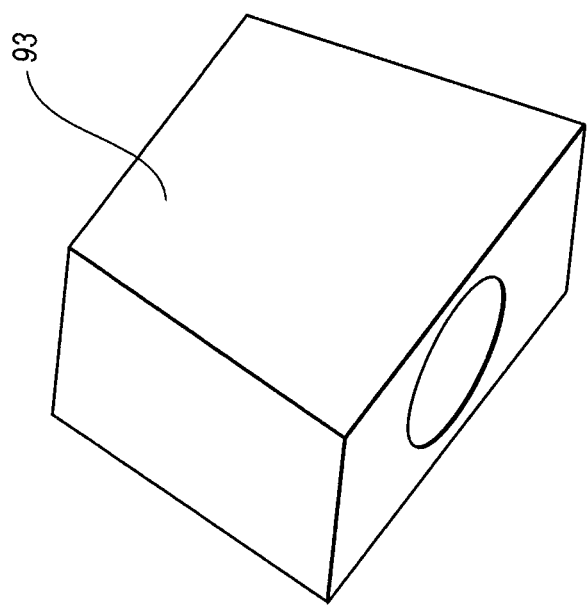
Figure 9E:
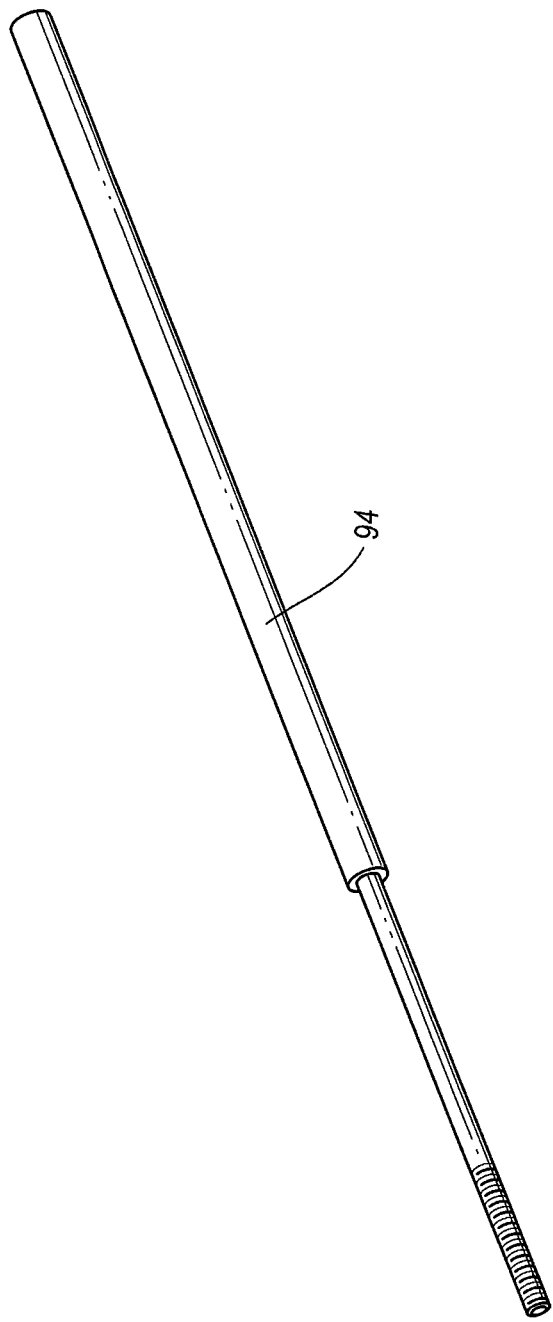

FIG. 9A illustrates a depiction of a cut away of a valve. As depicted in FIG. 9A when the threaded shaft 94 is turned in a clockwise direction the two wedges 93 depicted effectively move closer together. As the wedges 93 move closer together the wedged shaped surfaces of the wedge 93 interfaces with the slot 95 in the block 92 effectively moving the seats 58, 60 away from the blind and toward the main body 16 of the valve. Conversely, when the threaded shaft 94 is turned in a counter clockwise direction the two wedges 93 move apart. As the wedges 93 move apart, the wedged shaped surfaces of the wedges 93 interface with the angled surface of the slot 95 in the block 92 moving the seats 58, 60 toward the blind 4 (or if the blind 4 has been removed into the space formerly occupied by the blind 4), and away from the main body 16 of the valve. In some embodiments the tool could be designed to be turned clockwise to move the seats 58, 60 toward the blind/ space formerly occupied by the blind, and the tool could be designed to move the seats 58, 60 away from the blind 4 when turned in counterclockwise rotation.

In some embodiments, replacement of internal parts may be accomplished by removing the lower bonnet 34 instead of the upper bonnet 30. Accordingly, the attachment means 66 which attach the lower bonnet 34 to the main body upper valve 16 may be removed and the lower bonnet slid away from the main valve body 16. In doing so, the elements of the valve system contained within the lower chamber 36 may be exposed for maintenance, repair or replacement. The present invention contemplates routine maintenance of the elements of the valve system. According to the methods of some embodiments disclosed above for maintaining, repairing or replacing various elements of the valve system leaving the main body of the valve couple to a line provides many benefits including the ability to safely and efficiently maintain the isolation valves of the present invention during prescheduled down times. Some embodiments include the ability to assess more accurately and rapidly, without the inconvenience of removing the valve from a line, detrimental effects caused by thermal transient stresses.

Figure 10:
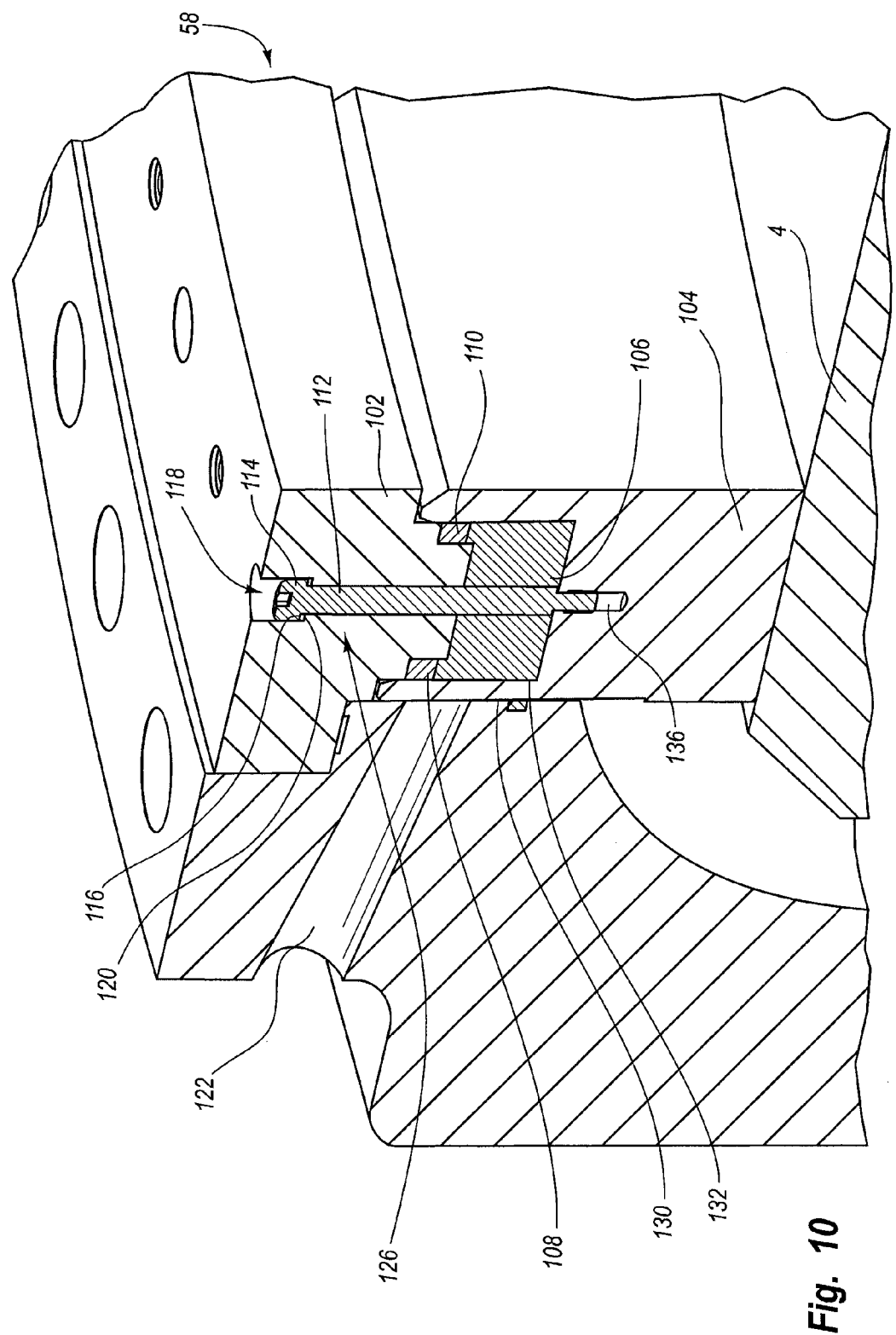
FIG. 10 illustrates an embodiment of a preassembled cartridge valve seat support system and valve body.

Some embodiments may utilize a preassembled seat cartridge. FIG. 10 depicts a seat system 50 according to some embodiments comprising a preassembled seat cartridge. Some seat systems 50 comprise an upper seat segment 102, a packing gland 106 and a lower seat segment 104 operably connected and in contact with a blind 4.

In some embodiments, the valve body 16 comprises an orifice for attaching to a steam line 122. The steam line 122, in some embodiments, has a direct and unobstructed path to the center of the seat system 50 where the shoulder bolt recess 118 and spring pockets 124 are located. The result of this structure is that steam will pressurize the internal elements of the seat system 50 to prevent contamination from both the process side and the interior of the body of the valve to enter into shoulder bolt recess 118 or spring pockets 124. In some embodiments this prevents any contaminate, including coke, from entering the spring pockets 124 and limiting the travel of the seat 104.

In some embodiments, between the valve body 16 and the upper seat segment 102 is a seat retainer 125. In some embodiments, seat retainer 125 is a gasket. In some embodiments, as depicted in FIG. 10, between the upper seat segment 102 and the lower seat segment 104 is an outer packing 108 and an inner packing 110. In such embodiments, each of the outer packing 108 and inner packing 110 may individually and/or the combination of outer packing 108 and inner packing 110 prevent steam from passing through the seat system 52 and entering either the process side of the valve or into the valve body. This effectively limits steam consumption while the valve is functioning in open positions, in closed positions and while throttling.

Also depicted in FIG. 10, disposed between upper seat segment 102 and lower seat segment 104 is packing gland 106. In some embodiments, packing gland 106 is held into connection with upper seat segment 102 and lower seat segment 104. In some embodiments, the shoulder bolt 112 holds the inner packing 110 and outer packing 108, the upper seat segment 102, the lower seat segment 104 and packing gland 106 together as cartridge. The vertical walls of the lower seat segment 130 prevent the inner packing 110 and the outer packing 108 from axial displacement. In some embodiments the vertical walls of lower seat segment 130 may be held against the upper seat segment by retaining bolt 128. The inner packing gland 110 and outer packing 108 form a seal preventing fluid passage of steam from the valve body into the process material, interior of a line or interior of a coke drum during coking operations, effectively decreasing the amount of steam utilized during coking operation, particularly during throttling. Inner packing 110 and/or outer packing 108 may be compressed between packing gland 106 upper seat segment 102 and lower seat segment 104, as retaining bolt 128 is tightened.

Figure 11:
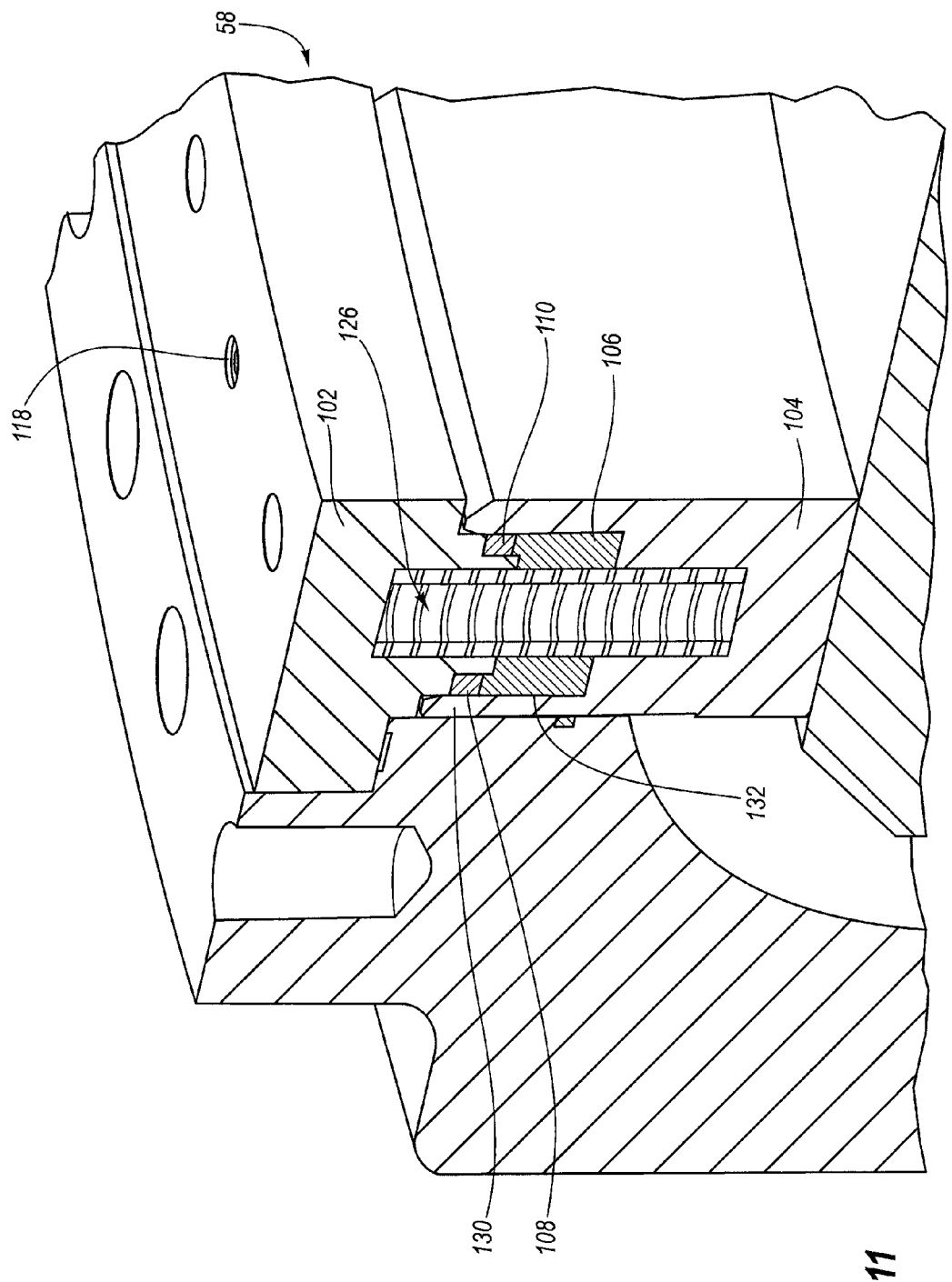
FIG. 11 illustrates an embodiment of a preassembled cartridge valve seat support system and valve body.
Figure 12:
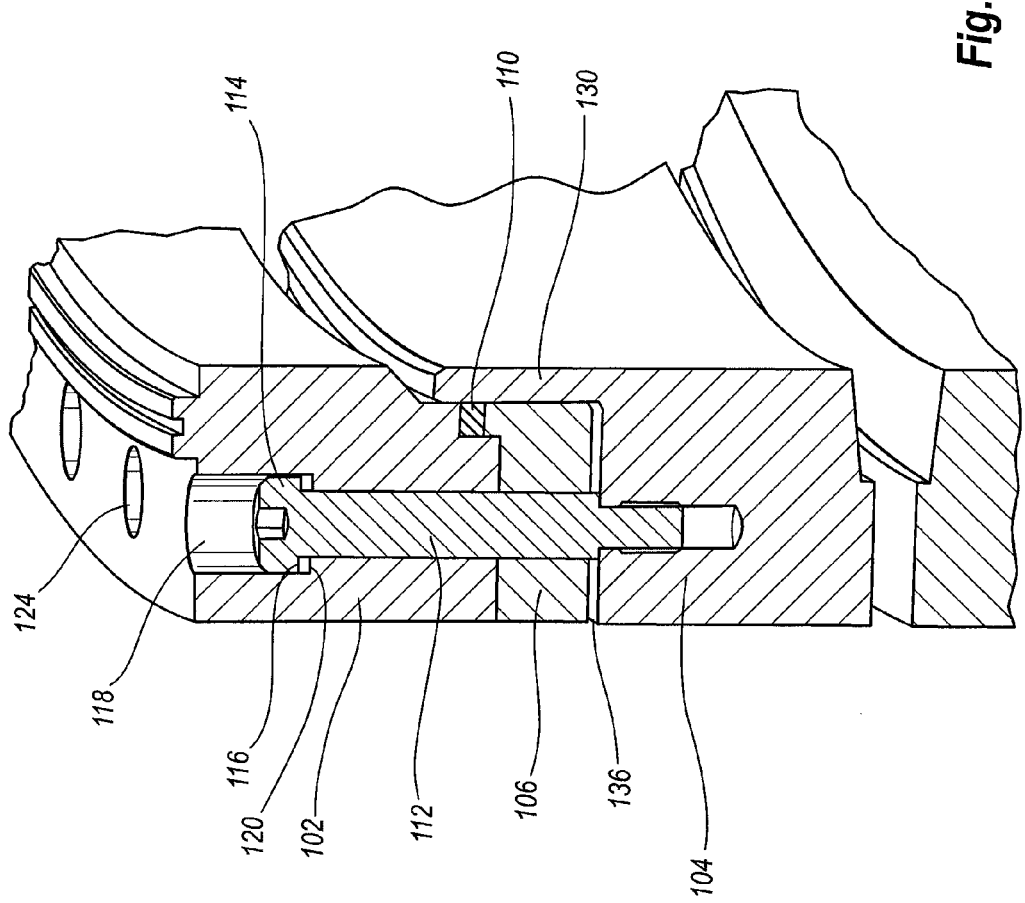
FIG. 12 illustrates an embodiment of a preassembled cartridge valve seat support system and valve body.

Some embodiments utilize a spring 126 in a spring pocket 124, where spring 126 is structured to apply a force between the upper seat segment 102 and lower seat segment 104. FIG. 11 illustrates an example of an embodiment of a seat system 50 comprising a spring 126. A gate 4 is moved against the lower edge of the lower seat segment 104 and an upward force is exerted on the lower seat segment 104 by the gate 4, the spring 126 may allow for dynamic movement of lower seat segment 104 responsive to the pressure applied by the blind 4. The shoulder bolt 112 is vertically displaced, and a space is created between the lower edge of the shoulder bolt head 116 and the lower surface of the shoulder bolt recess 120. The effect therefore of the pressure applied to the lower seat segment 104 by the blind 4 is the vertical displacement of not only the lower seat segment 104, but the shoulder bolt 112 as well. Thus, FIGS. 10, 11 and 13 depict a seat under little or no compression while FIG. 12 illustrates a seat configuration with a loaded shoulder bolt head 114 having been effectively displaced vertically upwards by the vertical movement of the lower seat segment 104 as gate 4 applies a force to the lower edge of the lower seat segment 104.

FIG. 11 illustrates the relationship between the upper seat segment 102, packing gland 106, lower seat segment 104 and shoulder bolt 112 according to some embodiments. The upper seat segment 102 and packing gland 106 are operably connected by shoulder bolt 112. Disposed between, and compressed between, the upper seat segment 102 and packing gland 106 are inner packing 110 and outer packing 108. Accordingly, as retaining bolt 128 is tightened, packing gland 106 is secured with increased force against the upper seat segment 102 and inner packing 110 and outer packing 108 are compressed. This vertical compression of inner packing 110 and outer packing 108 apply an axial force outward against the vertical walls of the lower seat segment 130.

In some embodiments, as the lower seat segment 104 is vertically displaced when pressure is applied by the blind 4, the vertical walls of the lower seat segment 130 slidably engage the vertical walls of the packing gland 132, while the vertical surface 132 of the packing gland 106 applies an outward axial pressure against the vertical walls of the lower seat segment 130 effectively preventing the flow of steam, liquid, gas and/or solid between the inner passage of the valve body and the internals of the valve itself.

In some embodiments, shoulder bolt 112 and spring 126 work in concert with each other to retain a dynamic relationship between the upper seat segment 102, the packing gland 106 and the lower seat segment 104. The spring 126 applying a pressure between the upper seat segment 102 and the lower seat segment 104 effectively pushing the upper seat segment 102 and lower seat segment 104 in opposite directions. In some embodiments where the upper seat segment 102 is fixably attached to the valve body 16, the spring 126 effectively applies a downward force on the lower seat segment 104, pressuring the lower seat segment 104 against the blind 4. As lower seat segment 104 encounters physical abnormalities, defects, and surface undulations in the blind 4 the lower seat segment 104 is allowed to be displaced vertically up and down to accommodate the surface variants of the blind. Repeated thermocycling may increase surface variations in a blind. Accommodating the surface variations with a dynamic lower seat segment 104 as depicted in FIGS. 10-13, allows a tight seal to form between the lower seat segment 104 and blind 4 effectively allowing for accumulated coke to be sheared away from blind 4, and to prevent the flow of process material from the interior of a line or from a coke drum into the internal component of the valve itself while using a minimum amount of steam.

In some embodiments, shoulder bolt 112 works in concert with spring 126, particularly as noted in FIG. 12, it can be seen that the shoulder bolt 112 is allowed to be displaced vertically inside the upper shoulder bolt recess 118. As noted previously, when the lower seat segment 104 encounters a surface variant in a blind 4, lower seat segment 104 is displaced vertically against the force of spring 126. As lower seat segment 104 is displaced vertically the size of the lower shoulder recess 136 is decreased, while the shoulder bolt head 114 moves vertically upward in the upper shoulder bolt recess 118. The maximum distance the lower seat segment 104 is allowed to move vertically can be set by establishing a finite amount of distance in the lower shoulder recess 136. In effect, when the spring 126 is maximally extended the lower surface of the shoulder bolt 116 contacts the lower surface of the shoulder bolt recess 120. Because the shoulder bolt 112 is fixedly attached to the lower seat segment 104, the lower seat segment 104 is retained and not allowed to extend, or drop into the space previously occupied by the gate 4 when the gate 4 is in an open position. Further, when the spring 126 is under maximal compression the space between the lower seat segment 104 and the packing gland 106 referred to as the lower shoulder recess 136 is closed. The fixed relationship of the upper seat segment 102 and the valve body 16 effectively block the lower seat segment 104 from additional vertical travel as the gate 4 is moved through open and closed positions.

Figure 13B:
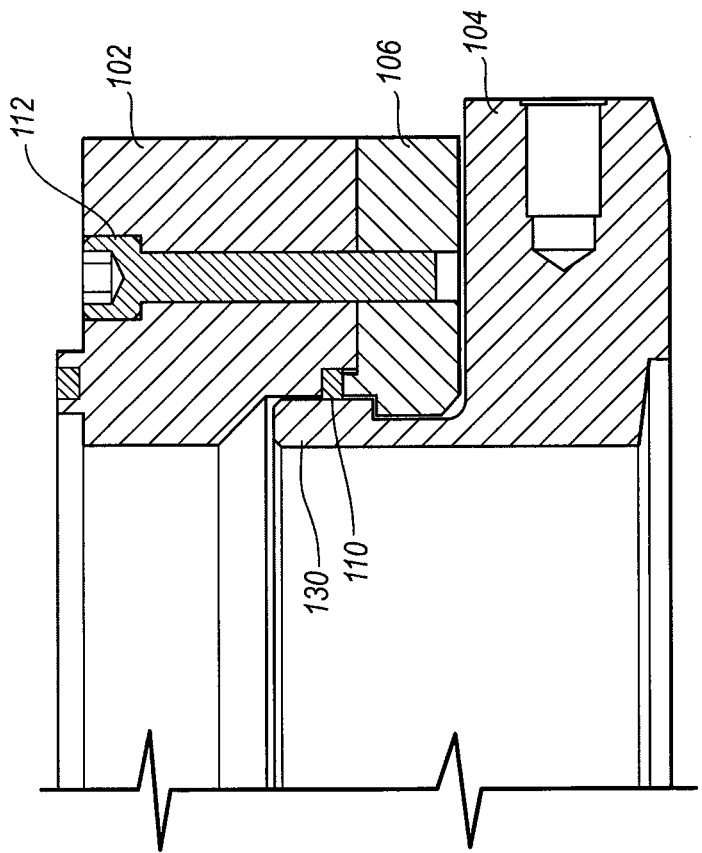
FIGS. 13A and 13B illustrates an embodiment of a preassembled cartridge valve seat support system and valve body.

FIG. 13B depicts a seat system 50 according to some embodiments. Some seat systems 50 comprise an upper seat segment 102, packing gland 106 and lower seat segment 104 operably connected and in contact with a blind 4. In some embodiments, as depicted in FIG. 13B, between the upper seat segment 102 and the lower seat segment 104 is an inner packing 110. In such embodiments, an outer pacing ring 108 is not utilized and the inner packing 110 may individually prevent steam from passing through the seat system 52 and entering either the process side of the valve or into the valve body. This effectively limits steam consumption while the valve is functioning in open positions, in closed positions and while throttling.

Also depicted in FIG. 13B, disposed between upper seat segment 102 and lower seat segment 104 is packing gland 106. In some embodiments, packing gland 106 is held into connection with upper seat segment 102 and lower seat segment 104. In some embodiments, the shoulder bolt 112 holds the upper seat segment 102, the lower seat segment 104 and packing gland 106 together as cartridge. The vertical wall of the lower seat segment 130 prevents the inner packing 110 and the outer packing 108 from axial displacement. In some embodiments, the vertical wall of lower seat segment 130 may be held against the upper seat segment 102 by retaining bolt 128. The inner packing gland 110 and outer packing 108 form a seal preventing fluid passage of steam from the valve body into the process material, interior of a line or interior of a coke drum during coking operations, effectively decreasing the amount of steam utilized during coking operation, particularly during throttling. Inner packing 110 may be compressed between packing gland 106 upper seat segment 102 and lower seat segment 104, as retaining bolt 128 is tightened.

Figure 13A:
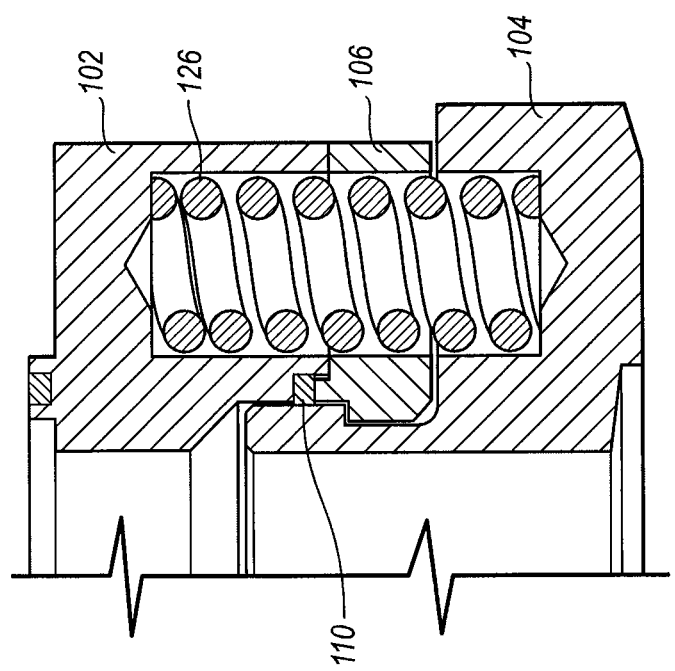

As illustrated in FIG. 13A some embodiments utilize a spring 126 in a spring pocket 124, where spring 126 is structured to apply a force between the upper seat segment 102 and lower seat segment 104. A gate 4 is moved against the lower edge of the lower seat segment 104 and an upward force is exerted on the lower seat segment 104 by the gate 4, the spring 126 may allow for dynamic movement of lower seat segment 104 responsive to the pressure applied by the blind 4.

FIG. 13B illustrates the relationship between the upper seat segment 102, packing gland 106, lower seat segment 104 and shoulder bolt 112 according to some embodiments. The upper seat segment 102 and packing gland 106 are operably connected by shoulder bolt 112. Disposed between, and compressed between, the upper seat segment 102 and packing gland 106 is inner packing 110. Accordingly, as retaining bolt 128 is tightened, packing gland 106 is secured with increased force against the upper seat segment 102 and inner packing 110 is compressed. This vertical compression of inner packing 110 applies an axial force outward against the vertical walls of the lower seat segment 130.

In some embodiments, as the lower seat segment 104 is vertically displaced when pressure is applied by the blind 4, the vertical walls 130 of the lower seat segment 104 slidably engage the vertical walls 132 of the packing gland 106, while the vertical surface 132 of the packing gland 106 applies an outward axial pressure against the vertical walls 130 of the lower seat segment 104 effectively preventing the flow of steam, liquid, gas and/or solid between the inner passage of the valve body and the internals of the valve itself.

In some embodiments, shoulder bolt 112 and spring 126, as depicted in FIGS. 13A and 13B, work in concert with each other to retain a dynamic relationship between the upper seat segment 102, the packing gland 106 and the lower seat segment 104. The spring 126 applying a pressure between the upper seat segment 102 and the lower seat segment 104 effectively pushing the upper seat segment 102 and lower seat segment 104 in opposite directions. In some embodiments where the upper seat segment 102 is fixably attached to the valve body 16, the spring 126 effectively applies a downward force on the lower seat segment 104, pressuring the lower seat segment 104 against the blind 4. As lower seat segment 104 encounters physical abnormalities, defects, and surface undulations in the blind 4 the lower seat segment 104 is allowed to be displaced vertically up and down to accommodate the surface variants of the blind. Repeated thermocycling may increase surface variations in a blind. Accommodating the surface variations with a dynamic lower seat segment 104 as depicted in FIGS. 10-13, allows a tight seal to form between the lower seat segment 104 and blind 4 effectively allowing for accumulated coke to be sheared away from blind 4, and to prevent the flow of process material from the interior of a line or from a coke drum into the internal component of the valve itself while using a minimum amount of steam.

Some embodiments comprise a method for isolating the flow of a fluid, gas or solid in a line said method comprising the steps of: equipping a line with a valve 14, said valve 14 coupled to said line and comprising: a main body 16 having means for connecting said valve to said line; a seat system 50 coupled to said main body 16; and a blind 4 coupled to said main body 16 and actuated by an actuator, said blind 4 capable of moving in a substantially lateral bi-directional manner within said valve 14 adjacent to said seat system 50 to control the opening and closing of said valve 14, said blind 4 providing a seal between said seat system 50 and said blind 4; closing said blind 4 and sealing said seat system 50 against said blind 4 to seal said valve blocking the flow of matter through the line; and opening said blind 4 by actuating said blind 4 and causing said blind to slide across said seat system 50 into an open position, allowing the flow of matter through the line.

I claim:

1. A valve seat system comprising:
a bifurcated first seat comprising an upper first seat segment biased against a lower first seat, wherein when the upper first seat segment is positioned on top of the lower first seat segment, a cavity is formed between the upper first seat segment and the lower first seat segment, the upper first seat segment being connected to the lower first seat segment by one or more shoulder bolts which limit the downward movement of the lower first seat segment when the position of the upper first seat segment remains fixed, the one or more shoulder bolts extending from the upper first seat segment through the cavity and into the lower first seat segment;
at least one spring disposed within the cavity between the upper and lower first seat segments, each spring biasing the lower first seat segment away from the upper first seat segment;
a packing gland disposed within the cavity between the upper and lower first seat segments; and
a blind in contact with the lower first seat segment, wherein the spring allows the lower first seat segment to move vertically with the contour of the blind as the blind is slid within the valve seat system while the upper first seat segment remains fixed.

2. The valve seat system of claim 1, further comprising at least one of an outer packing or an inner packing gland disposed within the cavity between the upper first seat segment and the lower first seat segment, the outer or inner packing glands being compressed when the lower first seat segment moves vertically thereby sealing the cavity.

3. The valve seat system of claim 1, further comprising a steam line by which the cavity is pressurized with steam.

4. The valve seat system of claim 1, wherein the cavity includes one or more spring pockets, each spring pocket extending into the upper and lower first seat segments to accommodate one of the at least one springs.

5. The valve system of claim 1, further comprising:
an inner packing gland and an outer packing gland, wherein the inner and outer packing glands are each positioned on top of the packing gland against a vertical wall of either the upper or lower first seat segment.

6. The valve seat system of claim 1, wherein the packing gland is fixed to the upper first seat segment thus forming a lower shoulder recess between the packing gland and the lower first seat segment when the lower first seat segment has been displaced downwardly.

7. A valve seat system comprising:
a first seat;
a second seat aligned with said first seat;
a blind comprising a planar surface that contacts a lower edge of the first seat and an upper edge of the second seat;
wherein the first seat comprises:
an upper seat segment biased against a lower first seat, wherein when the upper first seat segment is positioned on top of the lower first seat segment, a cavity is formed between the upper first seat segment and the lower first seat segment, the upper first seat segment being connected to the lower first seat segment by one or more shoulder bolts which limit the downward movement of the lower first seat segment when the position of the upper first seat segment remains fixed, the one or more shoulder bolts extending from the upper first seat segment through the cavity and into the lower first seat segment;
at least one spring disposed within the cavity between the upper and lower first seat segments, each spring biasing the lower first seat segment away from the upper first seat segment; and
a packing gland disposed within the cavity between the upper and lower first seat segments;
wherein the spring allows the lower first seat segment to move vertically with the contour of the blind as the blind is slid between the first and second seats while the upper first seat segment remains fixed.

8. The valve seat system of claim 7, further comprising at least one of an outer packing and an inner packing gland disposed in the cavity between the upper first seat segment and the lower first seat segment.

9. The valve seat system of claim 7, wherein the inner and outer packing gland are each positioned on top of the packing gland against a vertical wall of either the upper or lower first seat segment.

10. The valve seat system of claim 7, wherein the packing gland comprises a vertical wall structured to operably interact with a vertical wall of one of the lower first seat segment and the upper first seat segment.

11. The valve seat system of claim 7, wherein the one or more shoulder bolts are displaced upwardly when the lower first seat segment moves upwardly.

12. The valve seat system of claim 7, wherein the packing gland is fixed to the upper first seat segment such that a gap is formed between the packing gland and the lower first seat segment when the lower first seat segment is displaced downwardly.

13. The valve seat system of claim 7, wherein the cavity is formed by vertical walls of the lower first seat segment which extend up to a bottom surface of the upper first seat segment.

14. The valve seat system of claim 7, wherein the packing gland is fixed to the upper first seat segment by at least one of the one or more shoulder bolts.

15. The valve seat system of claim 9, wherein the packing gland is forced upwardly against the inner and outer packing glands when the lower first seat segment is moved upwardly thereby causing the inner and outer packing glands to become compressed between the packing gland and the upper first seat segment.

16. A bifurcated seat assembly, comprising:
an upper seat segment that is fixed to the body of a valve;
a lower seat segment configured to be positioned below the upper seat segment within the bifurcated seat assembly, wherein, when the lower seat segment is positioned below the upper seat segment, a cavity is formed between the upper and lower seat segment;
one or more shoulder bolts that extend from the upper seat segment through the cavity and into the lower seat segment, the one or more shoulder bolts limiting the downward movement of the lower seat segment;
one or more springs positioned within the cavity between the upper and lower seat segments, each spring applying a force to the upper and lower seat segment to bias the lower seat segment away from the upper seat segment; and
a packing gland positioned within the cavity between the upper and lower seat segments.

17. The bifurcated seat assembly of claim 16, wherein at least one of the one or more shoulder bolts secures the packing gland against a bottom surface of the upper seat segment, the bifurcated seat assembly further comprising:
an inner packing gland and an outer packing gland that are positioned within the cavity on top of the packing gland, wherein when the lower seat segment is moved upwardly, the packing gland also moves upwardly and compresses the inner and outer packing glands thereby sealing the cavity.

18. The bifurcated seat assembly of claim 16, wherein the one or more shoulder bolts move upwardly with respect to the upper seat segment when the lower seat segment is moved upwardly.

* * * * *